US012095977B2

(12) United States Patent
Kurihara et al.

(10) Patent No.: US 12,095,977 B2
(45) Date of Patent: Sep. 17, 2024

(54) IMAGE DISPLAY APPARATUS

(71) Applicant: SONY GROUP CORPORATION, Tokyo (JP)

(72) Inventors: Takayuki Kurihara, Tokyo (JP); Satoshi Mitani, Tokyo (JP); Yuji Nakahata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 42 days.

(21) Appl. No.: 17/784,234

(22) PCT Filed: Dec. 4, 2020

(86) PCT No.: PCT/JP2020/045156
§ 371 (c)(1),
(2) Date: Jun. 10, 2022

(87) PCT Pub. No.: WO2021/124916
PCT Pub. Date: Jun. 24, 2021

(65) Prior Publication Data
US 2023/0042351 A1  Feb. 9, 2023

(30) Foreign Application Priority Data

Dec. 18, 2019 (JP) .................. 2019-228449

(51) Int. Cl.
| G02B 27/00 | (2006.01) |
| G02B 27/01 | (2006.01) |
| G02B 27/42 | (2006.01) |
| H04N 9/31 | (2006.01) |
| H04N 13/302 | (2018.01) |
| H04N 13/363 | (2018.01) |
| H04N 13/383 | (2018.01) |

(52) U.S. Cl.
CPC ......... *H04N 13/363* (2018.05); *G02B 27/017* (2013.01); *G02B 27/4205* (2013.01); *H04N 9/3147* (2013.01); *H04N 13/302* (2018.05); *H04N 13/383* (2018.05)

(58) Field of Classification Search
CPC ............. H04N 13/363; H04N 9/3147; H04N 13/302; H04N 13/383; H04N 13/31; H04N 13/305; H04N 13/366; G02B 27/017; G02B 27/4205; G02B 30/27; G02B 30/30; G02B 30/26; G02B 5/32; G09G 5/00; G09G 5/02; G09G 5/10; G09G 5/36; G09G 5/38
See application file for complete search history.

(56) References Cited

U.S. PATENT DOCUMENTS

| 5,703,704 | A | 12/1997 | Nakagawa et al. |
| 7,506,011 | B2* | 3/2009 | Liu ........ G06F 16/273 |
| 8,305,899 | B2* | 11/2012 | Luo ........... H04L 47/17 370/428 |
| 2006/0103932 | A1 | 5/2006 | Relke et al. |
| 2012/0237461 | A1* | 9/2012 | Yu ............... A61K 8/25 424/59 |
| 2012/0251600 | A1* | 10/2012 | Yu ............ A61K 8/894 424/78.03 |
| 2014/0004073 | A1* | 1/2014 | Yu ............ A61Q 19/08 424/78.03 |
| 2015/0323525 | A1* | 11/2015 | Vidarsson ...... G01N 33/54373 506/9 |
| 2017/0100032 | A1* | 4/2017 | Zakariaie ........ A61B 3/0025 |
| 2017/0150133 | A1* | 5/2017 | Yoshida ........... H04N 13/383 |
| 2018/0188441 | A1 | 7/2018 | Fattal |

FOREIGN PATENT DOCUMENTS

| JP | H06-113339 | 4/1994 |
| JP | H07-257225 | 10/1995 |
| JP | 2005-533291 | 11/2005 |
| JP | 2015-087619 | 5/2015 |
| JP | 2016-014741 | 1/2016 |
| JP | 2016-014742 | 1/2016 |
| JP | 2018-533262 | 11/2018 |

OTHER PUBLICATIONS

International Search Report and Written Opinion prepared by the Japan Patent Office on Jan. 7, 2021, for International Application No. PCT/JP2020/045156, 3 pgs.

* cited by examiner

*Primary Examiner* — Frank F Huang
(74) *Attorney, Agent, or Firm* — SHERIDAN ROSS P.C.

(57) ABSTRACT

It is an objective of the invention of the present application to provide an image display apparatus capable of reducing a change in a display state of a virtual image that depends on a change in a viewpoint position. An image display apparatus according to an embodiment of the present technology includes an emission unit, a diffractive optical element, and an emission control unit. The emission unit emits image light of a target image. The diffractive optical element includes an incident surface and an emission surface, diffracts the image light entering the incident surface, emits the image light from the emission surface, and displays a virtual image that is the target image. The emission control unit controls emission of the image light by the emission unit by using image data generated in accordance with a change in a display state of the virtual image that depends on a change in a viewpoint position.

20 Claims, 17 Drawing Sheets

IMAGE DISPLAY APPARATUS

CROSS REFERENCE TO RELATED APPLICATIONS

This application is a national stage application under 35 U.S.C. 371 and claims the benefit of PCT Application No. PCT/JP2020/045156, having an international filing date of 4 Dec. 2020, which designated the United States, which PCT application claimed the benefit of Japanese Patent Application No. 2019-228449, filed 18 Dec. 2019, the entire disclosures of each of which are incorporated herein by reference.

TECHNICAL FIELD

The present technology relates to an image display apparatus that displays an image by using a virtual image.

BACKGROUND ART

In a holographic display system described in Patent Literature 1, a reflective hologram, a light-emitting display means, and the like are designed so that a virtual image is largely distorted when an observer observes the virtual image at a normal position. Accordingly, distortion (dynamic distortion) of the virtual image when moving the eyes from the observation position is reduced. Moreover, distortion is applied to a display image of light emitted from the light-emitting display means in advance in order to display the virtual image so that the distortion of the virtual image observed at the normal position is overcome. Accordingly, the dynamic distortion caused by the hologram is reduced (paragraphs [0020], [0031], [0042], and the like in specification of Patent Literature 1).

CITATION LIST

Patent Literature

Patent Literature 1: Japanese Patent Application Laid-open No. HEI 7-257225

DISCLOSURE OF INVENTION

Technical Problem

Thus, it is desirable to provide a technology capable of reducing distortion and the like of a virtual image that occur depending on a change in a viewpoint position.

In view of the above-mentioned circumstances, it is an objective of the present technology to provide an image display apparatus capable of reducing a change in a display state of a virtual image that depends on a change in a viewpoint position.

Solution to Problem

In order to accomplish the above-mentioned objective, an image display apparatus according to an embodiment of the present technology includes an emission unit, a diffractive optical element, and an emission control unit.

The emission unit emits image light of a target image.

The diffractive optical element includes an incident surface and an emission surface, diffracts the image light entering the incident surface, emits the image light from the emission surface, and displays a virtual image that is the target image.

The emission control unit controls emission of the image light by the emission unit by using image data generated in accordance with a change in a display state of the virtual image that depends on a change in a viewpoint position.

In this image display apparatus, the emission of the image light is controlled by using the image data generated in accordance with the change in the display state of the virtual image that depends on the change in the viewpoint position. Accordingly, the change in the display state of the virtual image that depends on the change in the viewpoint position can be reduced.

The change in the display state of the virtual image may include at least one of a change in a display position of the virtual image, a change in a luminance of the virtual image, or a change in chromaticity of the virtual image.

The emission unit may emit viewpoint image light of each of the plurality of viewpoint images that is a plurality of target images corresponding to a plurality of viewpoint positions. In this case, the emission control unit may control emission of the viewpoint image light by the emission unit by using a plurality of pieces of viewpoint image data that corresponds to the plurality of viewpoint images and is generated in accordance with the change in the display state of the virtual image that depends on the change in the viewpoint position.

The plurality of pieces of viewpoint image data may be subjected to image processing for correcting the change in the display state of the virtual image.

The image processing for correcting the change in the display state of the virtual image may be performed on the basis of optical properties of the diffractive optical element.

The image processing for correcting the change in the display state of the virtual image may include processing of continuously performing correction on each of the plurality of pieces of viewpoint image data in a predetermined direction.

The emission unit may include a plurality of projectors. In this case, using image light emitted from each of the plurality of projectors as corresponding image light, the emission control unit may use a plurality of pieces of corresponding image data corresponding to the plurality of projectors to control emission of corresponding image light by each of the plurality of projectors to thereby control the emission of the image light by the emission unit. Moreover, the plurality of pieces of corresponding image data may be generated in accordance with the change in the display state of the virtual image that depends on the change in the viewpoint position.

The emission unit may emit viewpoint image light of each of a plurality of viewpoint images that is a plurality of target images corresponding to a plurality of viewpoint positions. In this case, each of the plurality of pieces of corresponding image data may be divided into a plurality of image regions at least one of which corresponds to a part of the viewpoint image.

The image regions different from each other in at least one of the plurality of pieces of corresponding image data may correspond to respective parts of the viewpoint images different from each other.

Each of the plurality of pieces of corresponding image data may be subjected to image processing for correcting the change in the display state of the virtual image for each of the plurality of image regions.

The image processing for correcting the change in the display state of the virtual image may include processing of continuously performing correction on each of the plurality of image regions in a predetermined direction.

The emission unit may include a multi-view display constituted by any one system of a lenticular lens system, a lens array system, or a parallax barrier system. In this case, the emission control unit may control emission of the image light by the multi-view display by using multi-viewpoint image data generated in accordance with the change in the display state of the virtual image that depends on the change in the viewpoint position.

The multi-view display may emit viewpoint image light of each of a plurality of viewpoint images that is a plurality of target images corresponding to a plurality of viewpoint positions. In this case, the multi-viewpoint image data may be divided into a plurality of image regions corresponding to the plurality of viewpoint images.

The multi-viewpoint image data may be subjected to image processing for correcting the change in the display state of the virtual image for each of the plurality of image regions.

The image processing for correcting the change in the display state of the virtual image may include processing of continuously performing correction on each of the plurality of image regions in a predetermined direction.

The diffractive optical element may be a reflective holographic optical element or a transmissive holographic optical element.

The image display apparatus may further include a detection unit that detects the viewpoint position. In this case, the image data generated in accordance with the change in the display state may be image data generated in accordance with the viewpoint position. Moreover, the emission control unit may control the emission of the image light by the emission unit on the basis of the detected viewpoint position.

MODE(S) FOR CARRYING OUT THE INVENTION

Hereinafter, embodiments according to the present technology will be described with reference to the drawings.
[Basic Configuration of Image Display Apparatus]

Figure 1A:
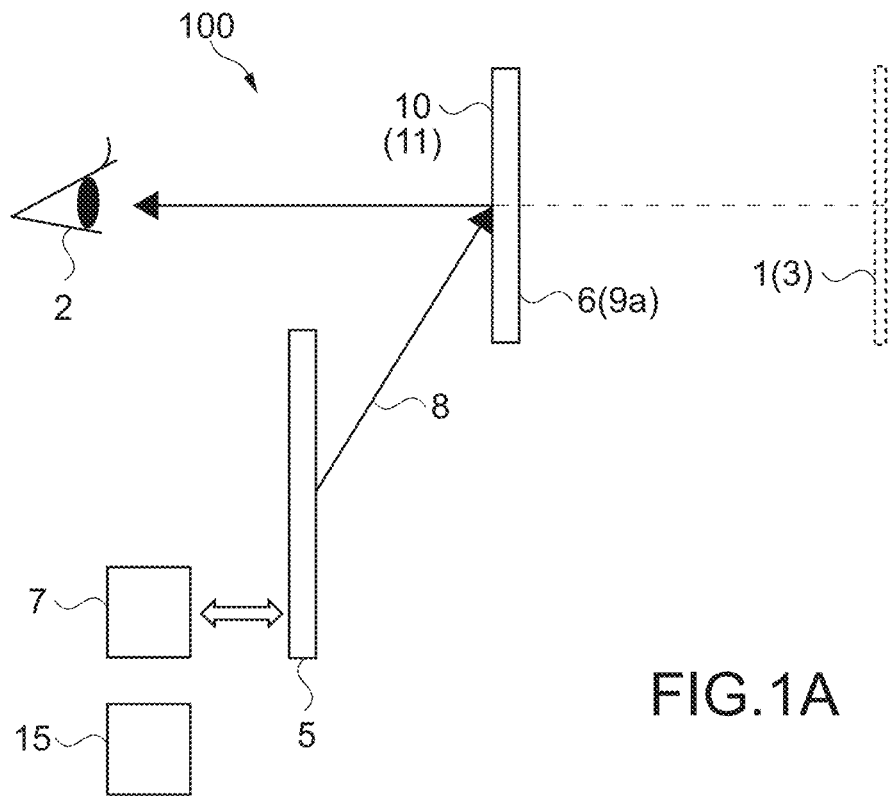
FIG. 1A A schematic diagram showing a basic configuration of an image display apparatus according to the present technology.
Figure 1B:
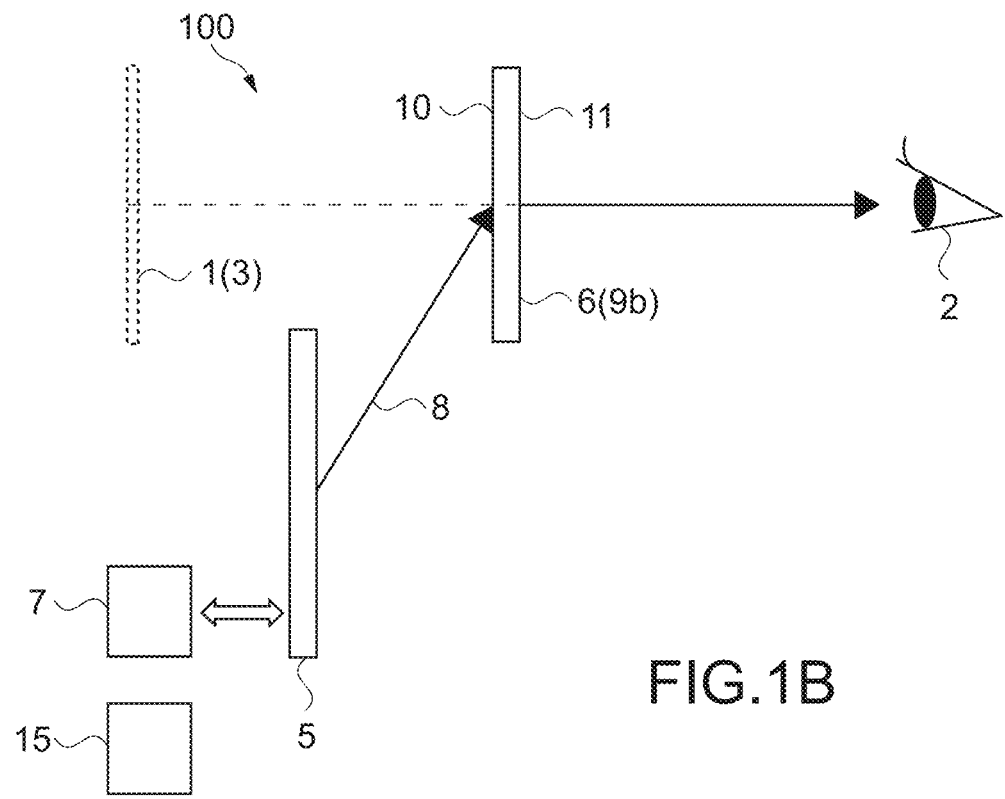
FIG. 1B A schematic diagram showing a basic configuration of an image display apparatus according to the present technology.

FIGS. 1A and 1B are schematic diagrams showing a basic configuration of an image display apparatus according to the present technology.

An image display apparatus 100 according to this embodiment functions as a virtual image display apparatus and is capable of displaying a virtual image to a user (observer).

As shown in FIGS. 1A and 1B, the image display apparatus 100 includes an emission unit 5, a diffractive optical element (DOE) 6, and an emission control unit 7.

The emission unit 5 emits image light 8 of a target image. The target image is an image that is a display target. The image light is light that configures the image. The emission of the image light can also be referred to as projection of the image.

Moreover, in the present disclosure, the image includes both a still image and a moving image (video).

A specific configuration example of the emission unit 5 will be described later.

The diffractive optical element 6 includes an incident surface 10 and an emission surface 11, diffracts the image light 8 entering the incident surface 10, emits the image light 8 from the emission surface 11, and displays a virtual image 1 that is the target image.

In this embodiment, the diffractive optical element 6 is configured to be transparent. It should be noted that in the present disclosure, "transparent" is a concept including "semi-transparent" and "colored and transparent".

In FIGS. 1A and 1B, a virtual image surface 3 on which the virtual image 1 is formed is schematically shown as the dotted-line region.

For example, a holographic optical element (HOE) is used as the diffractive optical element 6.

The HOE is an optical element using holography and diffracts light with interference fringes recorded in advance to thereby achieve light travelling direction control (optical path control).

For example, an HOE configured to emit, at a predetermined angle of emission, light entering the HOE at a predetermined angle of incidence is used as the diffractive optical element 6.

Accordingly, light entering the HOE (diffractive optical element 6) can be emitted in a desired direction. The HOE may have properties of a plane mirror/curved mirror.

In the example shown in FIG. 1A, a reflective holographic optical element (reflective HOE) 9a is used as the diffractive optical element 6.

The reflective HOE 9a is configured to diffract light entering the incident surface 10 within a specific angle range and emit the light to the same surface as the incident surface 10 and transmit light entering the incident surface 10 within the other angle range. Therefore, as shown in FIG. 1A, in the reflective HOE 9a, the incident surface 10 and the emission surface 11 are the same surface.

Light entering the reflective HOE 9a within the specific angle range is reflected at an angle of emission depending on the angle of incidence. Moreover, light entering the reflective HOE 9a at an angle of incidence other than the specific angle range is less likely to be diffracted by the interference fringes and passes through the reflective HOE 9a.

Accordingly, a transparent virtual-image screen is configured by the reflective HOE 9a, and the virtual image 1 superimposed on the background through the virtual-image screen can be displayed.

In the example shown in FIG. 1B, a transmissive holographic optical element (transmissive HOE) 9b is used as the diffractive optical element 6.

The transmissive HOE 9b is configured to diffract light entering the incident surface 10 within a specific angle range and emit the light to a surface opposite to the incident surface 10 and transmit light entering the incident surface 10 within the other angle range. Therefore, as shown in FIG. 1B, in the transmissive HOE 9b, the incident surface 10 and the emission surface 11 are surfaces opposite to each other.

Light entering the transmissive HOE 9b within the specific angle range is emitted from the emission surface 11 at an angle of emission depending on the angle of incidence. Moreover, light entering the transmissive HOE 9b at an angle of incidence other than the specific angle range is less likely to be diffracted by the interference fringes and passes through the transmissive HOE 9b.

Accordingly, the transmissive HOE 9b configures a transparent virtual-image screen, and the virtual image 1 superimposed on the background through the virtual-image screen can be displayed.

In a case where the transmissive HOE 9b is used as the diffractive optical element 6, the emission unit 5 can be disposed on the deep side as viewed from the user, and it is advantageous to improve the outer appearance of the apparatus.

A specific configuration of the HOE is not limited, and for example, a volume HOE having interference fringes recorded inside the element may be used. Alternatively, a relief (embossed) HOE or the like having interference fringes recorded as irregularities of the element surface or the like may be used.

Moreover, a diffractive optical element of a type that diffracts light by using a diffraction grating of a predetermined pattern or the like may be used other than the HOE that diffracts light by recorded interference fringes. Otherwise, an arbitrary diffractive optical element capable of displaying the virtual image 1 may be used.

The diffractive optical element 6 functions as a combiner that displays the virtual image 1 that is a display image to be superimposed on the background. In a case where the HOE is used as the diffractive optical element 6, it functions as a hologram combiner.

The emission control unit 7 controls the emission of the image light 8 by the emission unit 5 by using image data 15 generated in accordance with a change in the display state of the virtual image 1 that depends on a change in a viewpoint position 2. Accordingly, the change in the display state of the virtual image 1 that depends on the change in the viewpoint position 2 can be reduced.

The emission control unit 7 includes, for example, hardware required for a computer configuration, such as a processor such as a CPU, a GPU, and a DSP, a memory such as a ROM and a RAM, and a storage device such as an HDD.

For example, an arbitrary computer such as a personal computer (PC) can realize the emission control unit 7. As a matter of course, hardware such as an FPGA and an ASIC may be used.

The image data 15 and the operation and the like of the emission control unit 7 will be described later.

Figure 2A:
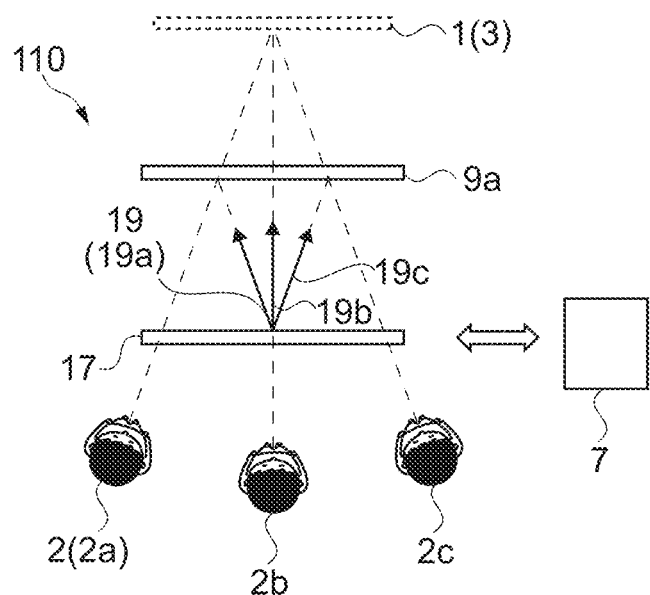
FIG. 2A A schematic diagram showing configuration examples of a multi-viewpoint display apparatus.
Figure 2B:
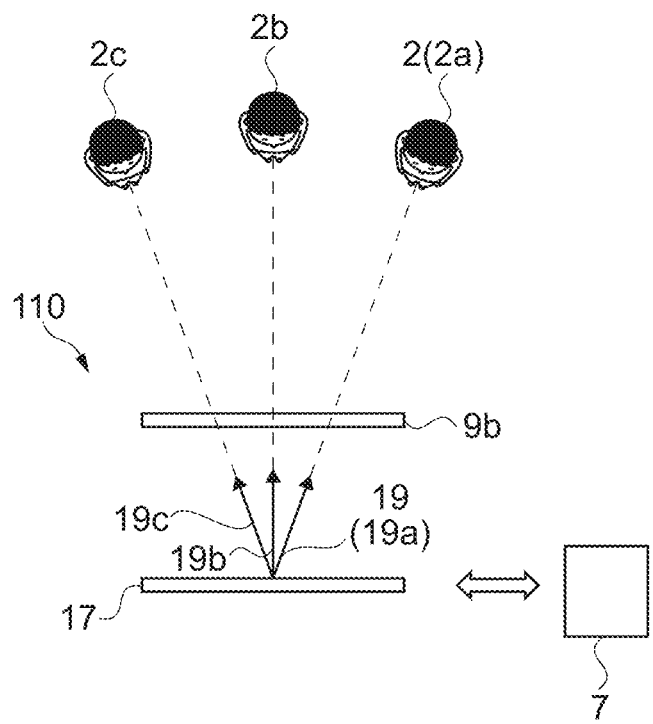
FIG. 2B A schematic diagram showing configuration examples of a multi-viewpoint display apparatus.

FIGS. 2A and 2B are schematic diagrams showing a configuration example of a multi-viewpoint display apparatus 110, which is an embodiment of the image display apparatus 100 shown in FIGS. 1A and 1B.

In FIG. 2A, a configuration example including the reflective HOE 9a is shown. In FIG. 2B, a configuration example including the transmissive HOE 9b is shown. In FIG. 2B, the illustrations of the virtual image 1 and the virtual image surface 3 are omitted.

The multi-viewpoint display apparatus 110 includes a multi-viewpoint video source 17, HOEs 9 (9a and 9b), and an emission control unit 7.

The multi-viewpoint video source 17 functions as the emission unit 5 shown in FIGS. 1A and 1B.

The multi-viewpoint video source 17 is capable of displaying a plurality of viewpoint images 18 (18a to 18c: see FIGS. 3A and 3B) corresponding to a plurality of viewpoint positions 2 (2a to 2c). That is, the multi-viewpoint video source 17 is capable of emitting respective viewpoint image light rays 19 (19a to 19c) of the plurality of viewpoint images 18 (18a to 18c).

The plurality of viewpoint images 18 (18a to 18c) corresponds to the plurality of target images corresponding to the plurality of viewpoint positions 2 (2a to 2c).

The HOEs 9 (9a and 9b) diffract and emit the plurality of viewpoint image light rays 19 (19a to 19c) emitted from the multi-viewpoint video source 17. Accordingly, the virtual image 1 of each of the plurality of viewpoint images 18 (18*a* to 18*c*) is displayed.

Figure 3A:
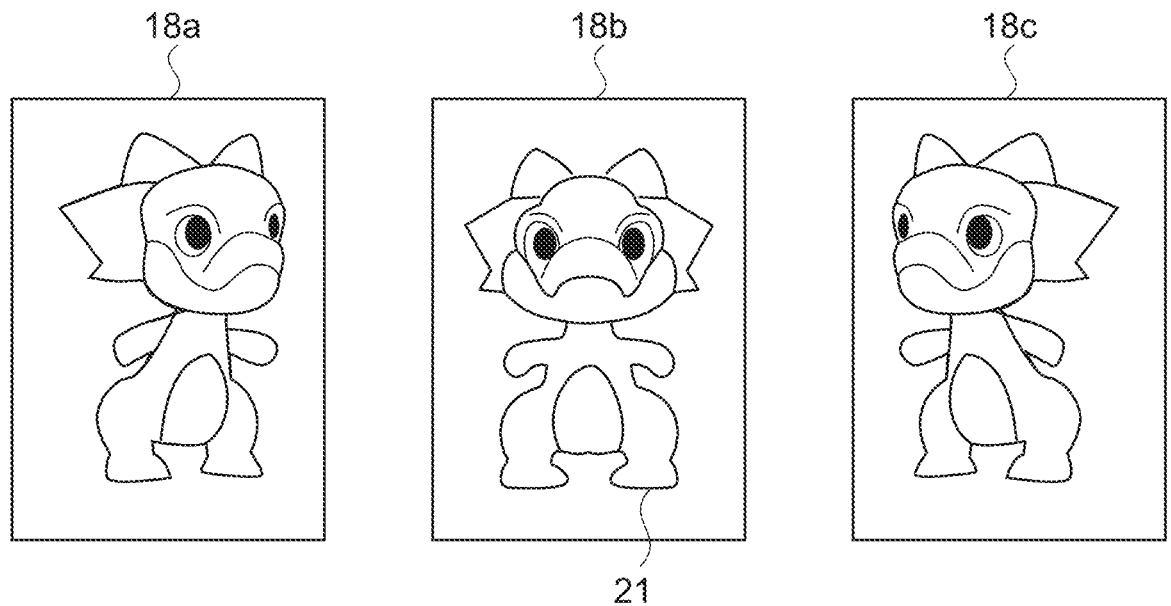
FIG. 3A A schematic diagram showing examples of viewpoint images.
Figure 3B:
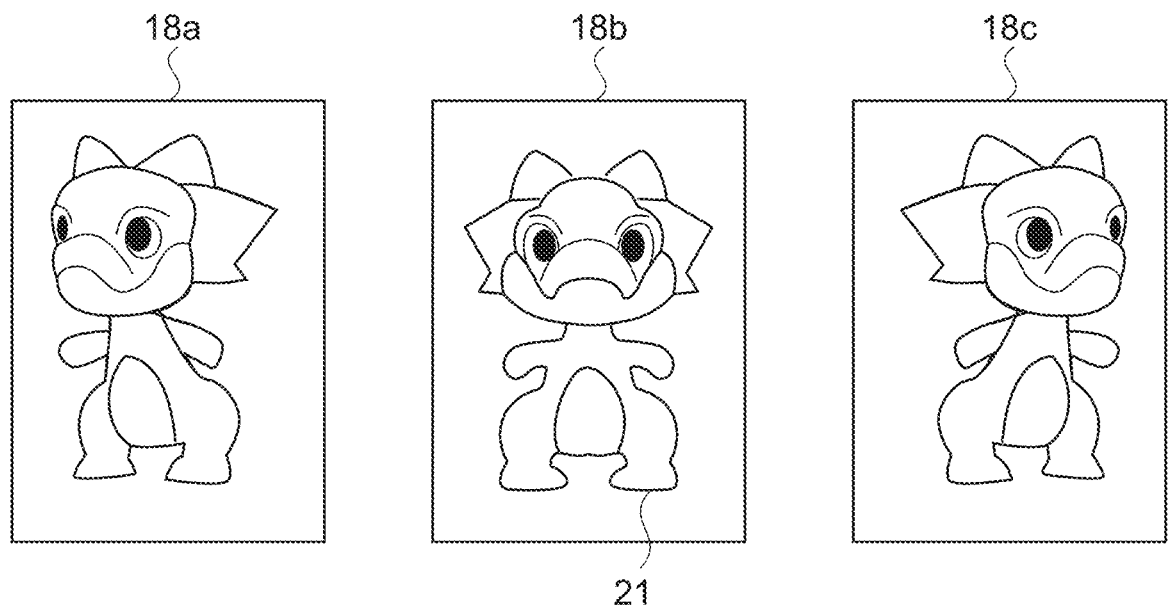
FIG. 3B A schematic diagram showing examples of viewpoint images.

FIGS. 3A and 3B are schematic diagrams showing examples of the viewpoint images 18*a* to 18*c*.

FIG. 3A is a schematic diagram showing an example of the viewpoint images 18*a* to 18*c* in the configuration including the reflective HOE 9*a* shown in FIG. 2A.

For example, as the viewpoint image 18*b* corresponding to the viewpoint position 2*b* that is a position in the front with respect to the multi-viewpoint display apparatus 110, an image when a character 21 is viewed from the front is displayed. The viewpoint image 18*b* is an image configured by the viewpoint image light ray 19*b*.

As the viewpoint image 18*a* corresponding to the viewpoint position 2*a* that is a position moved leftward from the viewpoint position 2*b* in the front with respect to the multi-viewpoint display apparatus 110, an image when the character 21 is obliquely seen from the left side is displayed. The viewpoint image 18*a* is an image configured by the viewpoint image light ray 19*a*.

As a viewpoint image 18*c* corresponding to the viewpoint position 2*c* that is a position moved rightward from the viewpoint position 2*b* in the front with respect to the multi-viewpoint display apparatus 110, an image when the character 21 is obliquely seen from the right side is displayed. The viewpoint image 18*c* is an image configured by the viewpoint image light ray 19*c*.

Accordingly, the virtual image 1 of the viewpoint image 18*b* can be observed from the viewpoint position 2*b* in the front. The virtual image 1 of the viewpoint image 18*a* can be observed from the viewpoint position 2*a* on the left side. The virtual image 1 of the viewpoint image 18*c* can be observed from the viewpoint position 2*c* on the right side.

As a result, moving the viewpoint position 2 leftward and rightward enables the different orientations of the character 21 to be observed.

For example, when the user moves the viewpoint position 2, the display of the virtual image 1 changes from the virtual image 1 observed from the viewpoint position 2 before the movement to the virtual image 1 observed from the viewpoint position 2 after the movement. For example, as illustrated in FIG. 3A, each the virtual image 1 observed from the viewpoint position 2 is generated so that the different orientations of the character 21 are expressed. That is, the viewpoint image 18 corresponding to each viewpoint position 2 is generated so that the different orientations of the character 21 are expressed. Accordingly, the different orientations of the character 21 can be observed.

FIG. 3B is a schematic diagram showing an example of the viewpoint images 18*a* to 18*c* in the configuration including the transmissive HOE 9*b* shown in FIG. 2B.

In a case where the transmissive HOE 9*b* is used as the diffractive optical element 6, the viewpoint images 18 configured by the viewpoint image light rays 19 emitted from the multi-viewpoint video source 17 are reproduced in a horizontally-flipped state with respect to the user. Thus, in a case where the transmissive HOE 9*b* is used, it is necessary to horizontally flip and display images wished to be reproduced.

For example, as shown in FIG. 3B, images obtained by horizontally flipping the viewpoint images 18 (18*a* to 18*c*) shown in FIG. 3A are displayed as the viewpoint images 18 (18*a* to 18*c*). The virtual image 1 obtained by horizontally flipping the viewpoint image 18*b* shown in FIG. 3B can be observed from the viewpoint position 2*b* in the front. The virtual image 1 obtained by horizontally flipping the viewpoint image 18*a* shown in FIG. 3B can be observed from the viewpoint position 2*a* on the left side. The virtual image 1 obtained by horizontally flipping the viewpoint image 18*c* shown in FIG. 3B can be observed from the viewpoint position 2*c* on the right side.

As a result, moving the viewpoint position 2 leftward and rightward enables the different orientations of the character 21 to be observed.

For example, by reducing the distance between the viewpoint positions 2 and increasing the number of viewpoint positions 2, the virtual image 1 of the display target can also be stereoscopically displayed to the user. In this case, stereoscopic observation as if the display target is actually arranged in front of the eyes can be performed.

It can also be said that the multi-viewpoint display apparatus 110 capable of stereoscopically displaying the virtual image 1 of the display target is a stereoscopic-image display apparatus.

Moreover, it can also be said that the multi-viewpoint video source 17 is a light beam reproduction apparatus that reproduces a light beam emitted from an object.

The emission control unit 7 controls the emission of the viewpoint image light rays 19 (19*a* to 19*c*) by the multi-viewpoint video source 17 by using a plurality of pieces of viewpoint image data corresponding to the plurality of viewpoint images 18.

In this embodiment, the plurality of pieces of viewpoint image data for respectively displaying the plurality of viewpoint images 18*a* to 18*c* illustrated in FIGS. 3A and 3B is used.

The plurality of pieces of viewpoint image data includes the image data 15 generated in accordance with the change in the display state of the virtual image 1 that depends on the change in the viewpoint position 2, which is illustrated in FIGS. 1A and 1B. That is, the plurality of pieces of viewpoint image data is generated in accordance with the change in the display state of the virtual image 1 that depends on the change in the viewpoint position 2.

Moreover, the plurality of pieces of viewpoint image data is image data subjected to image processing for correcting the change in the display state of the virtual image 1 that depends on the change in the viewpoint position 2.

The image processing for correcting the change in the display state of the virtual image 1 that depends on the change in the viewpoint position 2 will be described later in detail.

Figure 4:
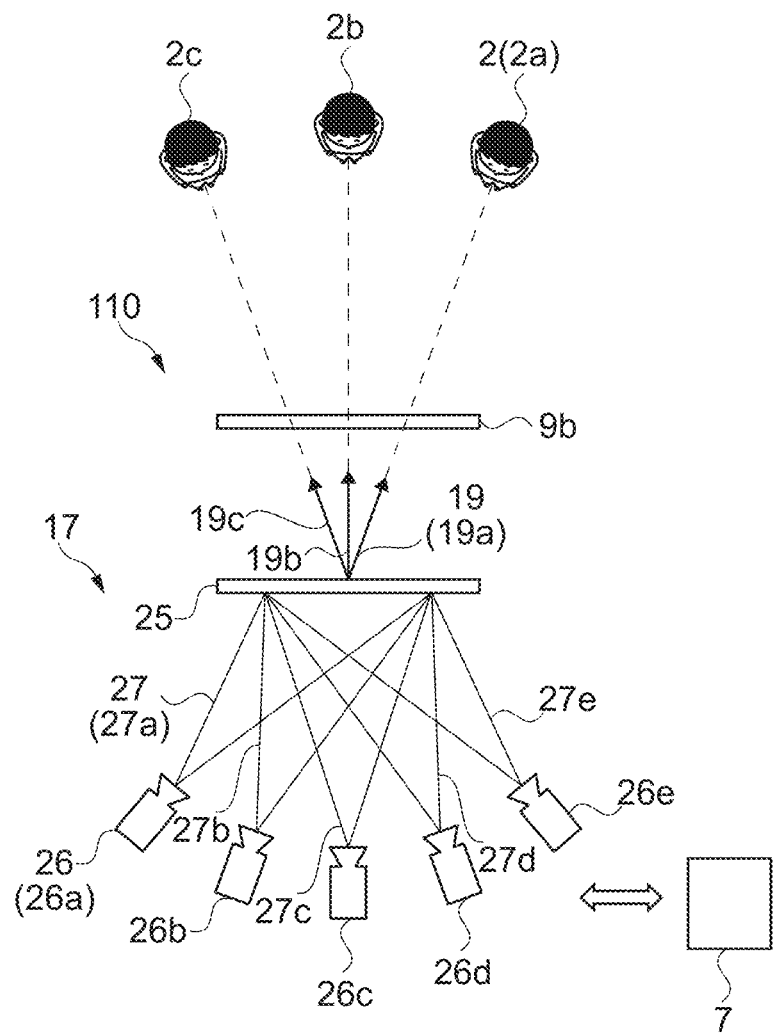
FIG. 4 A schematic diagram showing an example of a multi-viewpoint video source.

FIG. 4 is a schematic diagram showing an example of the multi-viewpoint video source 17.

In the example shown in FIG. 4, the multi-viewpoint video source 17 is realized by a display of a multi-projector system.

The display of the multi-projector system includes a transmissive anisotropic diffusion screen 25 and a plurality of projectors 26 (26*a* to 26*e*) that constitutes a projector array.

In the multi-viewpoint video source 17, the plurality of viewpoint image light rays 19*a* to 19*c* is emitted by projecting image light rays of the plurality of projectors 26*a* to 26*e* toward the transmissive anisotropic diffusion screen 25.

Hereinafter, the image light rays respectively emitted from the plurality of projectors 26*a* to 26*e* will be referred to as corresponding image light rays 27 (27*a* to 27*e*).

The anisotropic diffusion screen 25 functions as a real-image screen.

The anisotropic diffusion screen 25 diffuses and transmits the corresponding image light rays 27*a* to 27*e* respectively emitted from the plurality of projectors 26*a* to 26*e*. Accordingly, the plurality of viewpoint image light rays 19a to 19c is emitted toward the transmissive HOE 9b from the anisotropic diffusion screen 25.

The transmissive anisotropic diffusion screen 25 has anisotropic diffusion characteristics having different diffusivity in horizontal and vertical directions, for example. For example, it is configured so that the diffusivity in the horizontal direction is set to be smaller than that in the vertical direction and it has diffusion characteristics narrower with respect to the horizontal direction.

By arranging the anisotropic diffusion screen 25, the viewpoint images 18 configured by the viewpoint image light rays 19 can be reproduced with appropriate widths.

The anisotropic diffusion screen 25 is configured by, for example, a lens diffusion plate or the like having diffusivity in the horizontal and vertical directions that are biased by the use of a micro-lens array or the like. Alternatively, a transmissive HOE having anisotropic diffusion characteristics recorded may be used as the anisotropic diffusion screen 25. Otherwise, an arbitrary configuration may be employed.

The plurality of projectors 26a to 26e projects images toward the anisotropic diffusion screen 25. That is, the plurality of projectors 26a to 26e emits the corresponding image light rays 27a to 27e toward the anisotropic diffusion screen 25.

As the light sources of the projectors 26, laser light sources are desirably used. Accordingly, the viewpoint images 18 can be displayed using color light having a narrow wavelength width, the diffraction efficiency at the transmissive HOE 9b is improved, and the display luminance can be increased. Moreover, image blurring and the like due to the chromatic dispersion at the transmissive HOE 9b can be avoided.

As the light sources of the projectors 26, LED light sources may be used. In this case, limiting the wavelength width of the color light by the use of a wavelength filter or the like can realize image display with reduced color irregularity at inexpensive costs. In addition, specific configurations of the projectors 26 are not limited.

In the example shown in FIG. 4, the plurality of projectors 26a to 26e is arranged at a predetermined pitch so as to face a predetermined base position of the anisotropic diffusion screen 25. For example, a plurality of straight lines extending from the predetermined base position (e.g., a center position) of the anisotropic diffusion screen 25 is virtually defined so that an angle between straight lines adjacent to each other is a pitch of 3 degrees. The projectors 26 are arranged on the plurality of straight lines.

As a matter of course, the present technology is not limited to such a configuration, the number of projectors 26, the pitch between the projectors 26, the arrangement configuration of the plurality of projectors 26, and the like may be arbitrarily set so that desired viewpoint image light rays 19 can be projected.

The emission control unit 7 uses the plurality of pieces of corresponding image data corresponding to the plurality of projectors 26a to 26e to control the emission of the corresponding image light rays 27a to 27e by the plurality of projectors 26a to 26e. Accordingly, the emission of the plurality of viewpoint image light rays 19a to 19c by the multi-viewpoint video source 17 is controlled.

Figure 5:
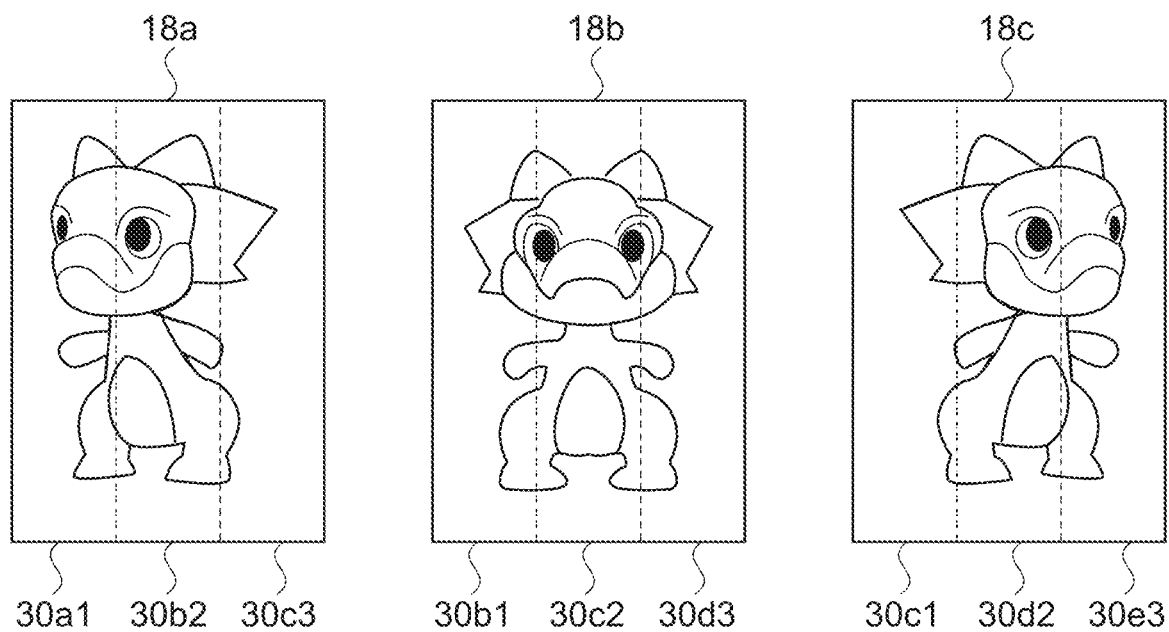
FIG. 5 A schematic diagram showing examples of a plurality of viewpoint images reproduced by the multi-viewpoint video source.

FIG. 5 is a schematic diagram showing an example of the plurality of viewpoint images 18a to 18c reproduced by the multi-viewpoint video source 17 according to this embodiment. The viewpoint image light ray 19a configures the viewpoint image 18a and the viewpoint image light ray 19b configures the viewpoint image 18b. Moreover, the viewpoint image light ray 19c configures the viewpoint image 18c.

Figure 6:
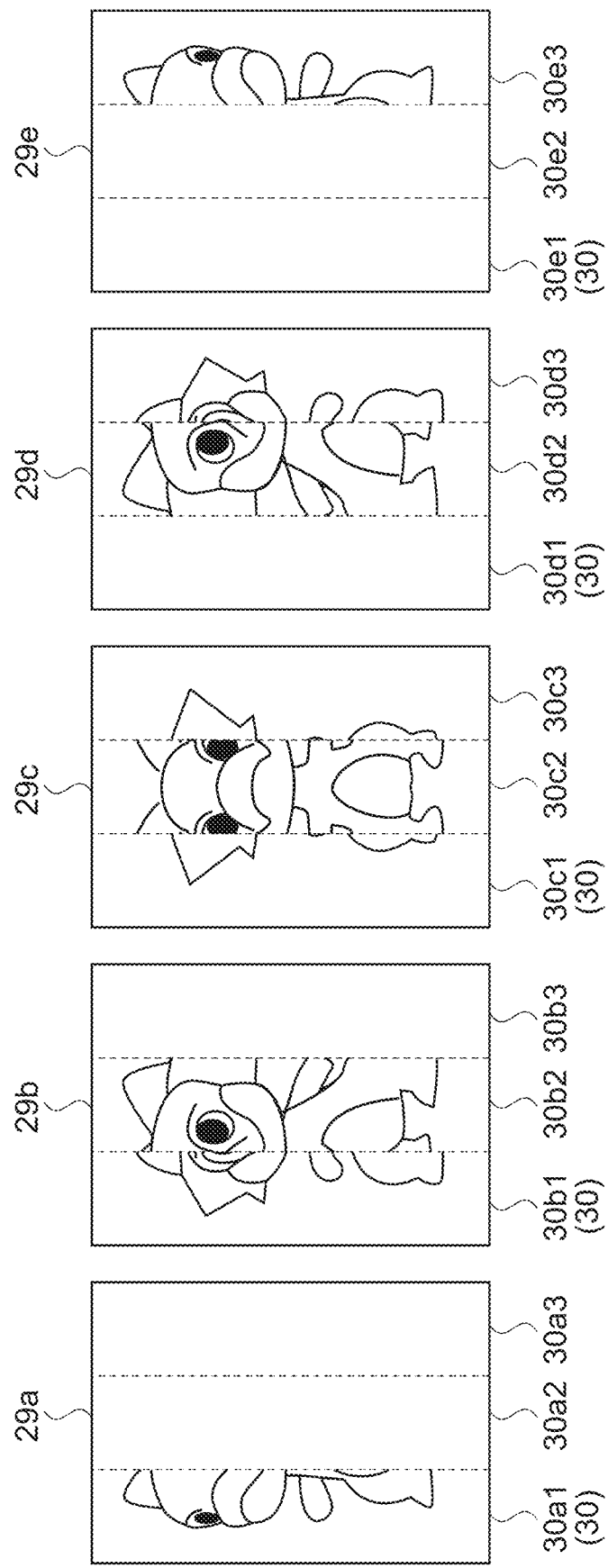
FIG. 6 A schematic diagram showing examples of a plurality of pieces of corresponding image data corresponding to a plurality of projectors.

FIG. 6 is a schematic diagram showing examples of a plurality of pieces of corresponding image data 29 (20a to 29e) corresponding to the plurality of projectors 26a to 26e. The correlations between the plurality of pieces of corresponding image data 29 shown in FIG. 6 and the plurality of projectors 26 shown in FIG. 5 are as follows.

The projector 26a—the corresponding image data 29a
The projector 26b—the corresponding image data 29b
The projector 26c—the corresponding image data 29a
The projector 26d—the corresponding image data 29a
The projector 26e—the corresponding image data 29a For each of the projectors 26, the emission of the corresponding image light ray 27 is controlled on the basis of the corresponding image data 29 corresponding thereto.

In the present disclosure, the image data and the image configured by the image light emitted on the basis of the image data is represented by the same drawing.

Therefore, for example, the drawing shown in FIG. 5 can also be used as the drawing representing the plurality of viewpoint images 18a to 18c and the drawing shown in FIG. 5 can also be used as the drawing representing the plurality of pieces of viewpoint image data corresponding to the plurality of viewpoint images 18a to 18c.

Moreover, the drawing shown in FIG. 6 can also be used as the drawing representing the plurality of pieces of corresponding image data 29a to 29e and can also be used as the drawing representing a plurality of images projected on the basis of the plurality of pieces of corresponding image data 29a to 29e.

As shown in FIG. 6, each of the plurality of pieces of corresponding image data 29a to 29e is divided into a plurality of image regions 30.

In the present disclosure, the image region 30 is a partial region in the image data and is a region that constitutes a partial image. The image region 30 is not necessarily limited to one region in the image data. A plurality of regions spaced apart from each other can also configure one partial image. In this case, the plurality of regions spaced apart from each other configures the single image region 30.

In the example shown in FIG. 6, each of the plurality of pieces of corresponding image data 29a to 29e is divided into three image regions 30, a left region, a middle region, and a right region divided into three equal parts with respect to a left and right direction of the image.

The corresponding image data 29a is divided into a left region 30a1, a middle region 30a2, and a right region 30a3. The corresponding image data 29b is divided into a left region 30b1, a middle region 30b2, and a right region 30b3. The corresponding image data 29c is divided into a left region 30c1, a middle region 30c2, and a right region 30c3. The corresponding image data 29d is divided into a left region 30d1, a middle region 30d2, and a right region 30d3. The corresponding image data 29e is divided into a left region 30e1, a middle region 30e2, and a right region 30e3.

As shown in FIG. 5, each viewpoint image 18 is divided into three parts with respect to a left and right direction as in the three image regions 30 of the corresponding image data 29. The following correlations are established between the left region, the middle region, and the right region of each viewpoint image 18 and the left region, the middle region, and the right region of each of the pieces of corresponding image data 29 shown in FIG. 6.

The viewpoint image 18a

The left region . . . the left region 30a1 of the corresponding image data 29a

The middle region . . . the middle region 30b2 of the corresponding image data 29b The right region . . . the right region 30c3 of the corresponding image data 29c The viewpoint image 18b The left region . . . the left region 30b1 of the corresponding image data 29b The middle region . . . the middle region 30c2 of the corresponding image data 29c The right region . . . the right region 30d3 of the corresponding image data 29d The viewpoint image 18c The left region . . . the left region 30c1 of the corresponding image data 29c The middle region . . . the middle region 30d2 of the corresponding image data 29d The right region . . . the right region 30e3 of the corresponding image data 29e That is, in this embodiment, each of the plurality of pieces of corresponding image data 29a to 29e is divided into the plurality of image regions 30 at least one of which corresponds to a part of the viewpoint image 18. In other words, at least one of the plurality of image regions 30 of each of the plurality of pieces of corresponding image data 29a to 29e corresponds to a part of the viewpoint image 18.

In each of the three pieces of corresponding image data 29b to 29d, image regions 30 different from each other correspond to respective parts of the viewpoint images 18 different from each other.

As a method of generating the corresponding image data 29 shown in FIG. 6, for example, first of all, each piece of viewpoint image data corresponding to each viewpoint image 18 is generated and each piece of viewpoint image data is divided into a plurality of image regions. By combining pieces of image data of the divided image regions of the respective pieces of viewpoint image data, the corresponding image data 29 shown in FIG. 6 is generated. As a matter of course, the present technology is not limited to this generation method.

The viewpoint image light ray 19a shown in FIG. 4 is constituted by the following corresponding image light.

The corresponding image light ray 27a emitted by the projector 26a on the basis of the left region 30a1 of the corresponding image data 29a (the image light that configures the left region of the image projected by the projector 26a)

The corresponding image light ray 27b emitted by the projector 26b on the basis of the middle region 30b2 of the corresponding image data 29b (the image light that configures the middle region of the image projected by the projector 26b)

The corresponding image light ray 27c emitted by the projector 26c on the basis of the right region 30c3 of the corresponding image data 29c (the image light that configures the right region of the image projected by the projector 26c)

Therefore, the viewpoint image 18a shown in FIG. 5 is realized by combining parts (the left region, the middle region, and the right region) of the images respectively projected by the projectors 26a, 26b, and 26c.

Moreover, the left region 30a1 of the corresponding image data 29a, the middle region 30b2 of the corresponding image data 29b, and the right region 30c3 of the corresponding image data 29c correspond to the viewpoint image data corresponding to the viewpoint image 18a.

The viewpoint image light ray 19b shown in FIG. 4 is configured by the following corresponding image light.

The corresponding image light ray 27b emitted by the projector 26b on the basis of the left region 30b1 of the corresponding image data 29b (the image light that configures the left region of the image projected by the projector 26b)

The corresponding image light ray 27c emitted by the projector 26c on the basis of the middle region 30c2 of the corresponding image data 29c (the image light that configures the middle region of the image projected by the projector 26c)

The corresponding image light ray 27d emitted by the projector 26d on the basis of the right region 30d3 of the corresponding image data 29d (the image light that configures the right region of the image projected by the projector 26d)

Therefore, the viewpoint image 18b shown in FIG. 5 is realized by combining parts (the left region, the middle region, and the right region) of the images projected respectively by the projectors 26b, 26c, and 26d.

Moreover, the left region 30b1 of the corresponding image data 29b, the middle region 30c2 of the corresponding image data 29c, and the right region 30d3 of the corresponding image data 29d correspond to the viewpoint image data corresponding to the viewpoint image 18b.

The viewpoint image light ray 19c shown in FIG. 4 is configured by the following corresponding image light.

The corresponding image light ray 27d emitted by the projector 26d on the basis of the left region 30d1 of the corresponding image data 29d (image light that configures the left region of the image projected by the projector 26d)

The corresponding image light ray 27d emitted by the projector 26d on the basis of the middle region 30d2 of the corresponding image data 29d (the image light that configures the middle region of the image projected by the projector 26d)

The corresponding image light ray 27e emitted by the projector 26e on the basis of the right region 30e3 of the corresponding image data 29e (the image light that configures the right region of the image projected by the projector 26e)

Therefore, the viewpoint image 18c shown in FIG. 5 is realized by combining parts (the left region, the middle region, and the right region) of the images respectively projected by the projectors 26c, 26d, and 26e.

Moreover, the left region 30c1 of the corresponding image data 29c, the middle region 30d2 of the corresponding image data 29d, and the right region 30d3 of the corresponding image data 29d correspond to the viewpoint image data corresponding to the viewpoint image 18c.

In this embodiment, at the viewpoint position 2b in the front, in addition to the light beam from the projector 26c in the front (the corresponding image light ray 27c of the middle region 30c2), the light beams from the projectors 26b and 26d adjacent thereto on the left and right sides (the corresponding image light ray 27b of the left region 30b1 and the corresponding image light ray 27d of the right region 30d3) also enter the eyes.

The light beam from each projector 26 (the corresponding image light ray 27 of each of the image regions 30) is diffused by the anisotropic diffusion screen 25, having a width. Thus, with the light beams of the three image regions 30 divided in a strip shape, the user can observe the single image (the virtual image 1).

Also at the other viewpoint positions 2a and 2c, the user can observe the single image (the virtual image 1).

[Emission of Control of Image Light]

As described above with reference to FIGS. 1A and 1B, the emission control unit 7 controls the emission of the image light 8 by the emission unit 5 by using the image data 15 generated in accordance with the change in the display state of the virtual image 1 that depends on the change in the viewpoint position 2.

The change in the display state of the virtual image 1 includes, for example, a change in the display position of the virtual image 1, a change in a luminance of the virtual image 1, and a change in chromaticity of the virtual image 1. It should be noted that it is likely that the present technology can also be applied to changes in other parameters related to the display state of the virtual image 1.

In the multi-viewpoint display apparatus 110 shown in FIGS. 2A and 2B, the emission of the plurality of viewpoint image light rays 19a to 19c by the multi-viewpoint video source 17 is controlled by using the plurality of pieces of viewpoint image data that corresponds to the plurality of viewpoint images 18a to 18c and is generated in accordance with the change in the display state of the virtual image 1 that depends on the change in the viewpoint position 2. The plurality of pieces of viewpoint image data is subjected to the image processing for correcting the change in the display state of the virtual image 1.

In the multi-viewpoint display apparatus 110 shown in FIG. 4, the emission of the plurality of viewpoint image light rays 19a to 19c by the multi-viewpoint video source 17 is controlled by controlling the emission of the corresponding image light rays 27a to 27e by the plurality of projectors 26a to 26e by using the plurality of pieces of corresponding image data 29a to 29e shown in FIG. 6.

The plurality of pieces of corresponding image data 29a to 29e is generated in accordance with the change in the display state of the virtual image 1 that depends on the change in the viewpoint position 2 and is subjected to the image processing for correcting the change in the display state of the virtual image 1.

Specifically, for each of the plurality of image regions 30 of each of the plurality of pieces of corresponding image data 29a to 29e, the image processing for correcting the change in the display state of the virtual image 1 is performed.

[Image Processing for Correcting Change in Display State of Virtual Image 1] The image processing for correcting the change in the display state of the virtual image 1 (hereinafter, adding the reference sign, simply referred to as image processing A), which is performed with respect to the viewpoint image data and the corresponding image data 29, will be described. Typically, image processing for overcoming (cancelling) the change in the display state of the virtual image 1 is performed.

The image processing A includes performing correction on the original viewpoint image data (the original corresponding image data 29) for displaying the viewpoint image 18 so as to be capable of overcoming the change in the display state of the virtual image 1. Moreover, the image processing A also includes using the original viewpoint image data (the original corresponding image data 29) as it is without correcting it for example in a case where there is no change in the display state of the virtual image 1.

It can also be said that the image processing A includes processing of performing correction on the original viewpoint image data (the original corresponding image data 29) so as to be capable of overcoming the change in the display state of the virtual image 1 depending on needs.

For example, it can also be said that the drawings shown in FIGS. 5 and 6 are drawings representing the original viewpoint image data (the original corresponding image data 29).

The image processing A is typically performed on the basis of the optical properties of the diffractive optical element 6.

For example, at a predetermined timing such as delivery of the image display apparatus 100 (multi-viewpoint display apparatus 110), the image processing A is performed on the basis of calibration and the like. As a matter of course, the present technology is not limited thereto. While the image display apparatus 100 (multi-viewpoint display apparatus 110) is used, the image processing A may be performed at a predetermined timing.

[Change in Display Position of Virtual Image 1]

Figure 7:
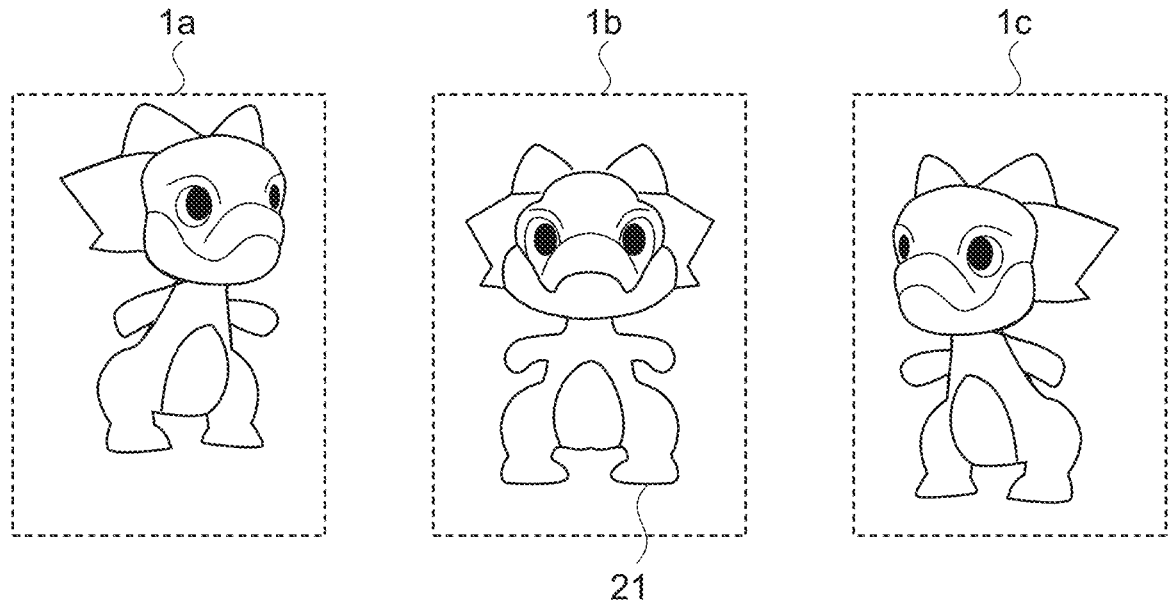
FIG. 7 A schematic diagram showing an example of a change in a display position of a virtual image.

FIG. 7 is a schematic diagram showing an example of the change in the display position of the virtual image 1.

FIG. 7A is a virtual image 1a (the virtual image 1 corresponding to the viewpoint image 18a) observed from the viewpoint position 2a.

FIG. 7B is a virtual image 1b (the virtual image 1 corresponding to the viewpoint image 18b) observed from the viewpoint position 2b.

FIG. 7C is a virtual image 1c (the virtual image 1 corresponding to the viewpoint image 18c) observed from the viewpoint position 2c.

As shown in FIG. 7, the display position of the virtual image 1 can change depending on the left or right movement of the viewpoint position 2.

In the example shown in FIG. 7, when moving from the viewpoint position 2b in the front to the viewpoint position 2a on the left side, the display of the virtual image 1 changes from the virtual image 1b to the virtual image 1a. At that time, the display position of the virtual image 1 moves upward.

When moving from the viewpoint position 2b in the front to the viewpoint position 2c on the right side, the display of the virtual image 1 changes from the virtual image 1b to the virtual image 1c. At that time, the display position of the virtual image 1 moves downward.

Such a change in the display position of the virtual image 1 can occur due to, for example, a change in the angle of emission of diffraction light by the diffractive optical element 6. For example, when the viewpoint position 2 changes, the viewpoint image 18 (the viewpoint image light ray 19) that is the observation target is switched. At this time, when the angle of incidence of each of the viewpoint image light rays 19 with respect to the diffractive optical element 6 changes, the angle of emission of each of the diffracted viewpoint image light rays 19 changes. As a result, the display position of the virtual image 1 changes. As a matter of course, the change in the display position can also occur due to any other factor.

Figure 8:
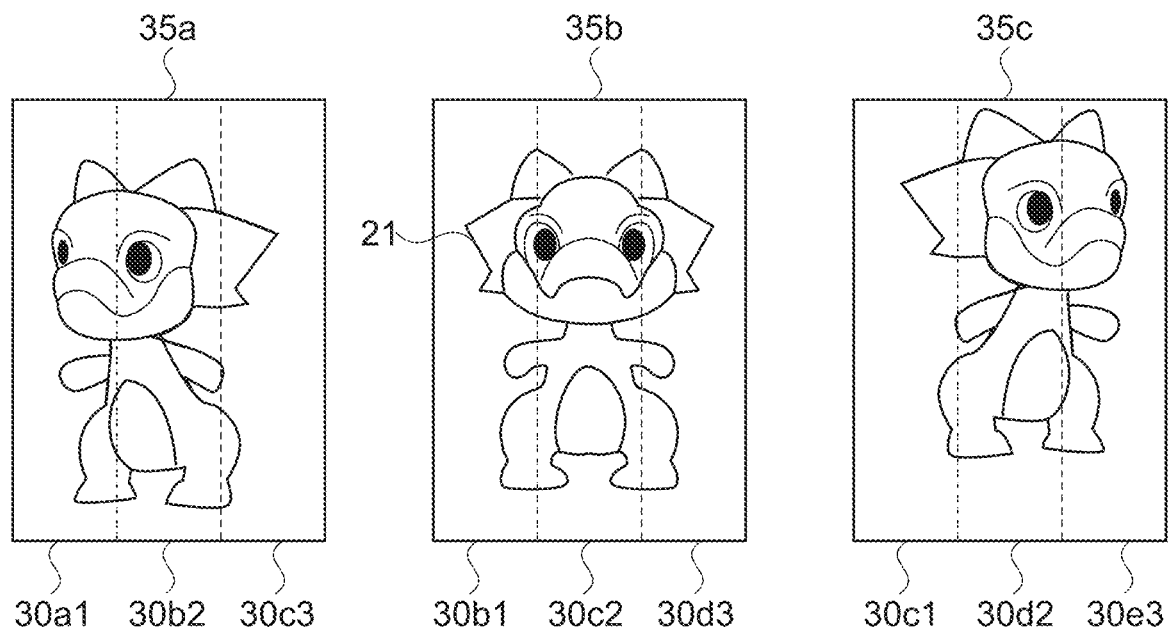
FIG. 8 A schematic diagram showing an example of viewpoint image data generated in accordance with the change in the display position of the virtual image.

FIG. 8 is a schematic diagram showing an example of viewpoint image data 35 (35a to 35c) generated in accordance with the change in the display position of the virtual image 1.

By performing the image processing A, the viewpoint image data 35a to 35b capable of overcoming the change in the display position of the virtual image 1 are generated.

In this embodiment, such viewpoint image data 35 that the character 21 is displayed at a position deviated in a direction opposite to the change direction of the virtual image 1 is generated.

As shown in FIG. 8, as the viewpoint image data 35a for generating the viewpoint image 18a corresponding to the viewpoint position 2a, image data in which the character 21 is moved downward and displayed is generated.

As the viewpoint image data 35b for generating the viewpoint image 18b corresponding to the viewpoint position 2b, image data in which the character 21 is not moved and is displayed at the original position is generated.

As the viewpoint image data 35c for generating the viewpoint image 18c corresponding to the viewpoint position 2c, image data in which the character 21 is moved upward and displayed is generated.

Figure 9:
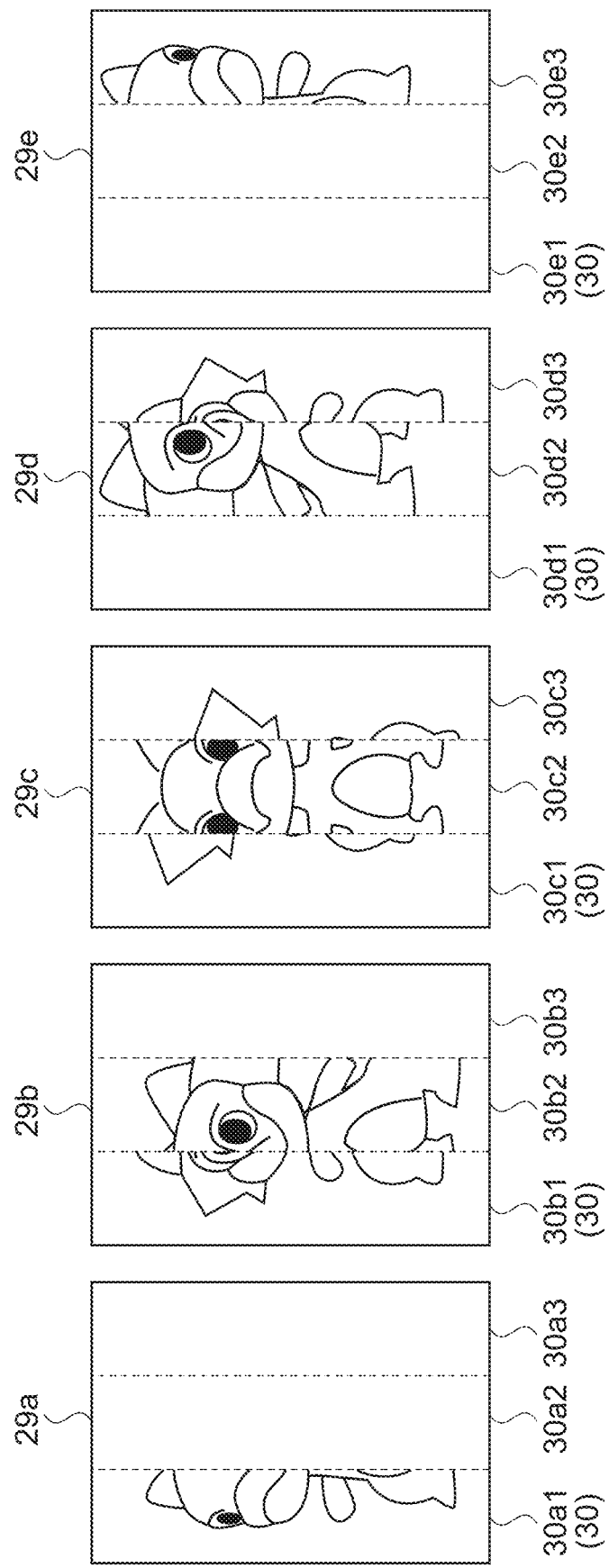
FIG. 9 A schematic diagram showing an example of corresponding image data generated in accordance with the change in the display position of the virtual image.

FIG. 9 is a schematic diagram showing an example of the corresponding image data 29 (29a to 29e) generated in accordance with the change in the display position of the virtual image 1.

For each of the plurality of image regions 30, the image processing A is performed, and the viewpoint image data 35a to 35b capable of overcoming the change in the display position of the virtual image 1 are generated.

In the corresponding image data 29a, the correction is performed on the left region 30a1 so that the display contents are moved downward and displayed.

In the corresponding image data 29b, the correction is performed on the middle region 30b2 so that the display contents are moved downward and displayed.

In the corresponding image data 29c, the correction is performed on the left region 30c1 so that the display contents are moved upward and displayed. Moreover, the correction is performed on the right region 30c3 so that the display contents are moved downward and displayed.

In the corresponding image data 29d, the correction is performed on the middle region 30d2 so that the display contents are moved upward and displayed.

In the corresponding image data 29e, the correction is performed on the right region 30e3 so that the display contents are moved upward and displayed.

The image processing A generates the plurality of pieces of viewpoint image data 35a to 35c as shown in FIG. 8 and the plurality of pieces of corresponding image data 29a to 29e as shown in FIG. 9.

Accordingly, the change in the display position of the virtual image 1 that depends on the change in the viewpoint position 2 can be reduced, and high-quality viewing experience can be provided. That is, and high-quality multi-viewpoint display can be realized.

It should be noted that the change in the display position of the virtual image 1 that depends on the change in the viewpoint position 2 is not limited to the change in an upper and lower direction (vertical direction). A change in the display position in another direction can also occur in accordance with the optical properties of the diffractive optical element 6 and the like.

Moreover, it is also not limited to the case where the display position of the entire virtual image 1 changes depending on the viewpoint position 2. The display position of each region (the left region, the middle region, the right region) of the virtual image 1 can also individually change depending on the change in the viewpoint position 2.

The display position of the virtual image 1 can also change in such various aspects. In any aspect, by the image processing A generating the plurality of pieces of viewpoint image data 35 and the plurality of pieces of corresponding image data 29, the change in the display position of the virtual image 1 that depends on the change in the viewpoint position 2 can be reduced.

[Change in Luminance of Virtual Image 1]

Figure 10:
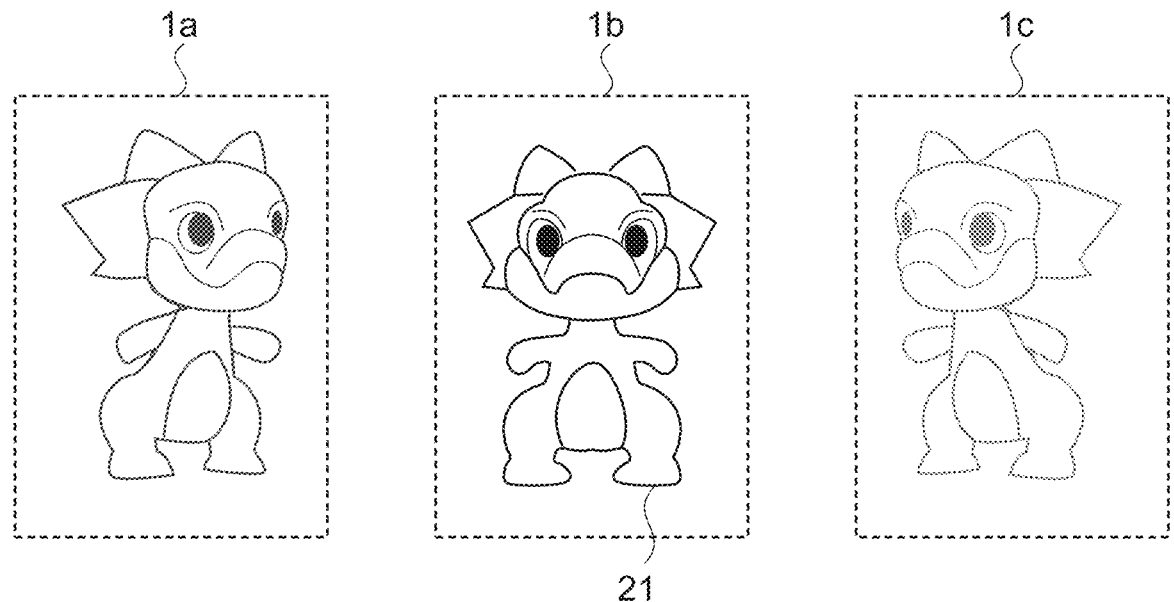
FIG. 10 A schematic diagram showing an example of a change in a luminance of the virtual image.

FIG. 10 is a schematic diagram showing an example of the change in the luminance of the virtual image 1.

FIG. 10A is the virtual image 1a (the virtual image 1 of the viewpoint image 18a) observed from the viewpoint position 2a.

FIG. 10B is the virtual image 1b (the virtual image 1 of the viewpoint image 18b) observed from the viewpoint position 2b.

FIG. 10C is the virtual image 1c (the virtual image 1 of the viewpoint image 18c) observed from the viewpoint position 2c.

In FIG. 10, the luminance levels are expressed with the gray-color progression. The color closer to black indicates a higher luminance and the color closer to white indicates a lower luminance.

As shown in FIG. 10, the luminance of the virtual image 1 can change depending on the left or right movement of the viewpoint position 2.

In the example shown in FIG. 10, when moving from the viewpoint position 2b in the front to the viewpoint position 2a on the left side, the display of the virtual image 1 changes from the virtual image 1b to the virtual image 1a. At that time, the luminance of the virtual image 1 lowers.

When moving from the viewpoint position 2b in the front to the viewpoint position 2c on the right side, the display of the virtual image 1 changes from the virtual image 1b to the virtual image 1c. Also at that time, the luminance of the virtual image 1 lowers. It should be noted that as the virtual image 1a and the virtual image 1c are compared with each other, the virtual image 1c has a lower luminance.

Such a change in the display position of the virtual image 1 can occur due to, for example, a change in the diffraction efficiency of the diffractive optical element 6. For example, when the viewpoint position 2 changes, the viewpoint image 18 (the viewpoint image light ray 19) that is the observation target is switched. At this time, when the angle of incidence of each of the viewpoint image light rays 19 with respect to the diffractive optical element 6 changes, the diffraction efficiency of each of the diffracted viewpoint image light rays 19 changes. As a result, the luminance of the virtual image 1 changes. As a matter of course, the change in the luminance can also occur due to any other factor.

Figure 11:
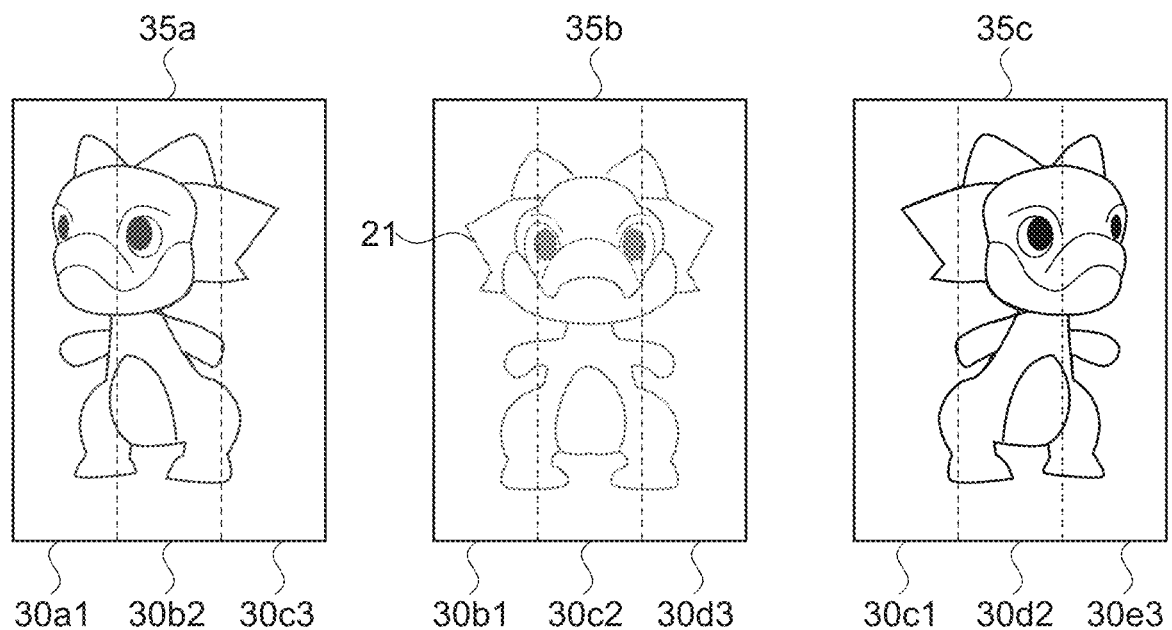
FIG. 11 A schematic diagram showing an example of viewpoint image data generated in accordance with the change in the luminance of the virtual image.

FIG. 11 is a schematic diagram showing an example of the viewpoint image data 35 (35a to 35c) generated in accordance with the change in the luminance of the virtual image 1.

By performing the image processing A, the viewpoint image data 35a to 35b capable of overcoming the change in the luminance of the virtual image 1 are generated.

In this embodiment, in order to overcome the change in the luminance of the virtual image, the brightness of the viewpoint image 18 (the luminance value of the viewpoint image data 35) is controlled. For example, with respect to the viewpoint image 18 the virtual image 1 of which is displayed at a lower luminance, the brightness (luminance value) is set to be higher. With respect to the viewpoint image 18 the virtual image 1 of which is displayed at a higher luminance, the brightness (luminance value) is set to be lower.

Otherwise, the brightness of the viewpoint images 18 (the luminance values of the viewpoint image data 35) corresponding to the other virtual images 1 is controlled to match the luminance of the virtual image 1 most decreased in luminance.

It should be noted that in FIG. 11, the brightness levels (luminance values) are expressed as the gray-color progression. The color closer to black indicates higher brightness (higher luminance value) and the color closer to white indicates lower luminance (lower luminance value).

As shown in FIG. 11, the luminance value of the viewpoint image data 35c is corrected so that the viewpoint image 18c corresponding to the viewpoint position 2c has the highest brightness.

The luminance values of the viewpoint image data 35a and 35b are corrected so that the virtual image 1 is displayed at a luminance equal to the luminance of the virtual image 1c corresponding to the viewpoint image 18c.

Specifically, the luminance value of the viewpoint image data 35b is corrected so that the viewpoint image 18b corresponding to the viewpoint position 2b has the lowest brightness.

The luminance value of the viewpoint image data 35a is corrected so that the viewpoint image 18a corresponding to the viewpoint position 2a has brightness (hereinafter, referred to as intermediate brightness) between the brightness of the viewpoint image 18c and the brightness of the viewpoint image 18b.

Figure 12:
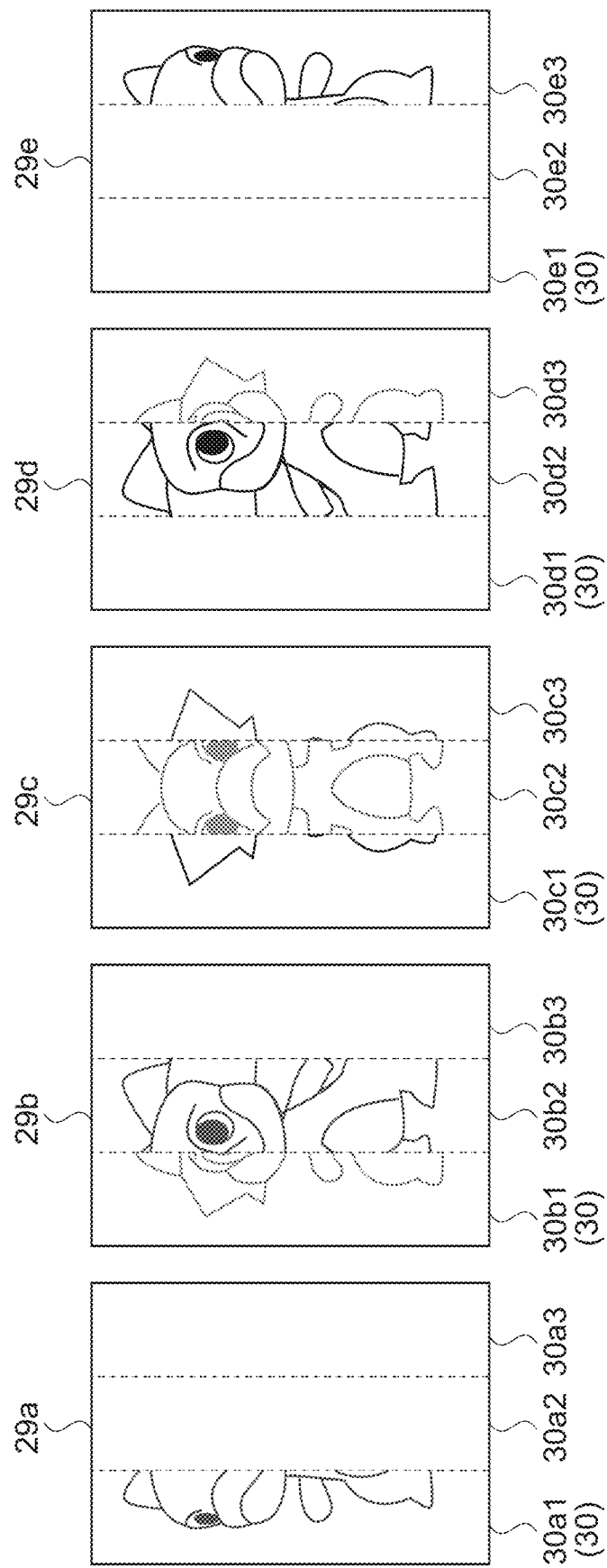
FIG. 12 A schematic diagram showing an example of corresponding image data generated in accordance with the change in the luminance of the virtual image.

FIG. 12 is a schematic diagram showing an example of the corresponding image data 29 (29a to 29e) generated in accordance with the change in the luminance of the virtual image 1.

For each of the plurality of image regions 30, the image processing A is performed, and the viewpoint image data 35a to 35b capable of overcoming the change in the luminance of the virtual image 1 are generated.

In the corresponding image data 29a, with respect to the left region 30a1, the luminance value is corrected so that the image has the intermediate brightness.

In the corresponding image data 29b, with respect to the left region 30b1, the luminance value is corrected so that the image has the lowest brightness. Moreover, with respect to the middle region 30b2, the luminance value is corrected so that the image has the intermediate brightness.

In the corresponding image data 29c, with respect to the left region 30c1, the luminance value is corrected so that the image has the highest brightness. Moreover, with respect to the middle region 30c2, the luminance value is corrected so that the image has the lowest brightness. Moreover, with respect to the right region 30c3, the luminance value is corrected so that the image has the intermediate brightness.

In the corresponding image data 29d, with respect to the middle region 30d2, the luminance value is corrected so that the image has the highest brightness. Moreover, with respect to the right region 30d3, the luminance value is corrected so that the image has the lowest brightness.

In the corresponding image data 29e, with respect to the right region 30e3, the luminance value is corrected so that the image has the highest brightness.

By the image processing A, the plurality of pieces of viewpoint image data 35a to 35c as shown in FIG. 11 and the plurality of pieces of corresponding image data 29a to 29e as shown in FIG. 12 is generated.

Accordingly, the change in the luminance of the virtual image 1 that depends on the change in the viewpoint position 2 can be reduced, and high-quality viewing experience can be provided. That is, a desired light beam can be reproduced with respect to the display target (the character 21), and high-quality multi-viewpoint display can be realized.

It should be noted that the present technology is not limited to the case where the luminance of the entire virtual image 1 changes depending on the viewpoint position 2. The luminance of each region (the left region, the middle region, the right region) of the virtual image 1 can also individually change depending on the change in the viewpoint position 2.

Also in such a case, by the image processing A generating the plurality of pieces of viewpoint image data 35 and the plurality of pieces of corresponding image data 29, the change in the luminance of the virtual image 1 that depends on the change in the viewpoint position 2 can be reduced.

[Change in Chromaticity of Virtual Image 1]

Regarding the HOEs 9, the diffraction efficiency depending on the angle of incidence is different for each wavelength of incident light. Thus, the chromaticity of the virtual image 1 can also change depending on the change in the viewpoint position 2.

For example, in each of the virtual images 1a to 1c shown in FIGS. 7 and 10, the chromaticity can be different. The character 21 looks blue from the viewpoint position 2b in the front. The character 21 looks blue-green from the viewpoint position 2a on the left side. Moreover, the character 21 looks violet from the viewpoint position 2a on the left side. Such a change in the chromaticity can occur.

By performing the image processing A, the viewpoint image data 35a to 35b and the corresponding image data 29a to 29e that are capable of overcoming the change in the chromaticity of the virtual image 1 are generated.

The viewpoint image data 35 (the image regions 30 of the corresponding image data 29) is corrected so that, for example, the chromaticity of the viewpoint image 18 changes in the chromaticity direction that is opposite to that of the change in the chromaticity that occurs in the virtual image 1.

Figure 13:
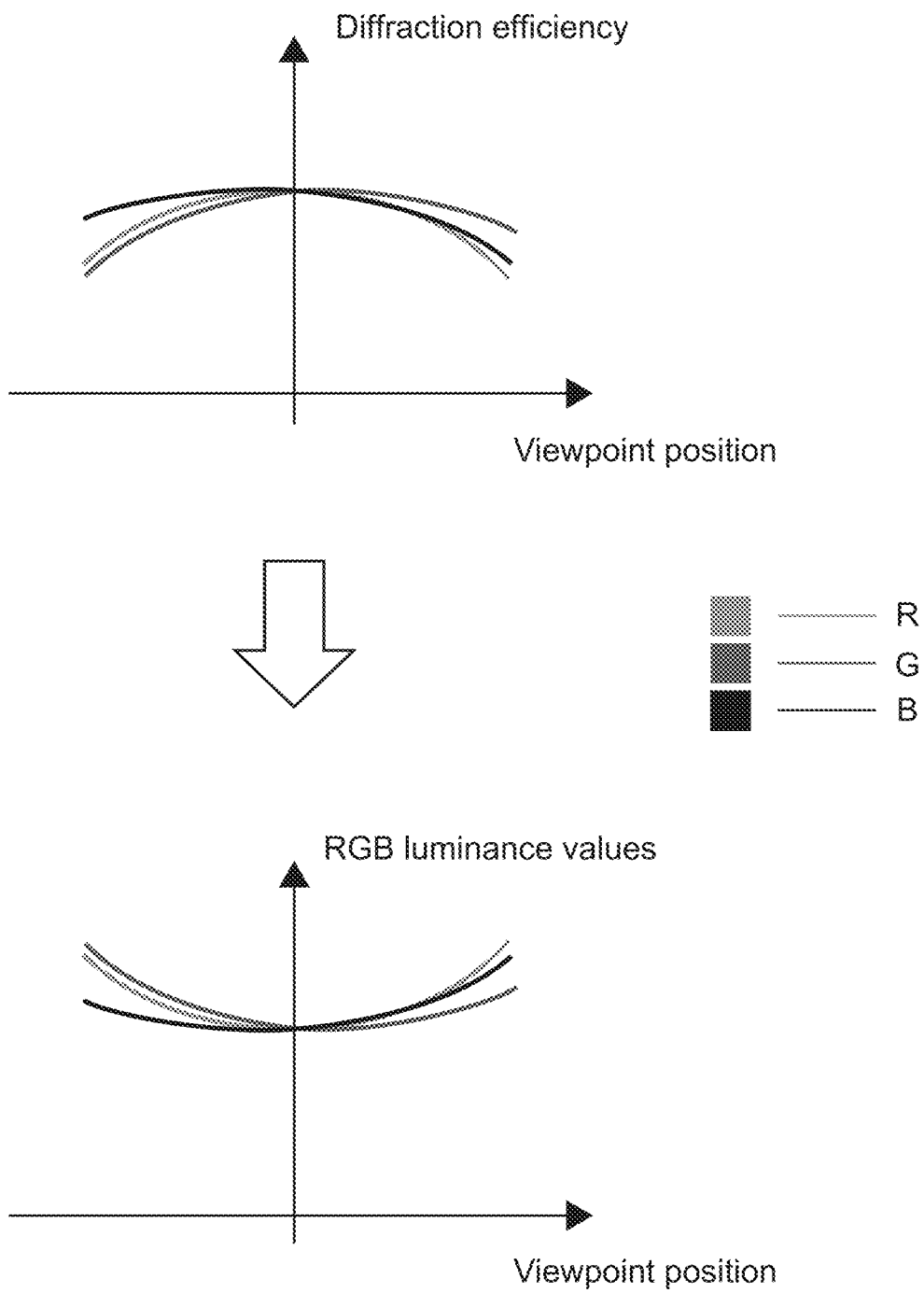
FIG. 13 A schematic diagram for describing an example of image processing for correcting a change in chromaticity of the virtual image.

FIG. 13 is a schematic diagram for describing an example of the image processing A.

The graph on the upper side of FIG. 13 is a graph showing the diffraction efficiency with respect to the RGB color light depending on the viewpoint position 2. The graph on the lower side of FIG. 13 is a schematic diagram showing the setting values of the respective RGB luminance values of the viewpoint image data 35 for displaying the viewpoint image 18 depending on the viewpoint position 2.

As shown in FIG. 13, the luminance value of light of each color in the viewpoint image data 35 is set in accordance with the diffraction efficiency of light of each color depending on the viewpoint position 2. A lower luminance value is set for the color light with higher diffraction efficiency and a higher luminance value is set for the color light with lower diffraction efficiency.

For example, by performing such image processing A, the plurality of pieces of viewpoint image data 35a to 35c and the plurality of pieces of corresponding image data 29a to 29e are generated.

Accordingly, the change in the chromaticity of the virtual image 1 that depends on the change in the viewpoint position 2 can be reduced, and high-quality viewing experience can be provided. That is, a desired light beam can be reproduced with respect to the display target (the character 21), and high-quality multi-viewpoint display can be realized.

It should be noted that the present technology is not limited to the case where the chromaticity of the entire virtual image 1 changes depending on the viewpoint position 2. The chromaticity of each region (the left region, the middle region, the right region) of the virtual image 1 can also individually change depending on the change in the viewpoint position.

Also in such a case, by the image processing A generating the plurality of pieces of viewpoint image data 35 and the plurality of pieces of corresponding image data 29, the change in the chromaticity 1 that depends on the change in the viewpoint position 2 can be reduced.

It should be noted that it can also be said that the image processing A described with reference to FIG. 13 is processing for overcoming the change in the diffraction efficiency of the HOEs 9 that depends on the change in the viewpoint position 2.

Figure 14A:
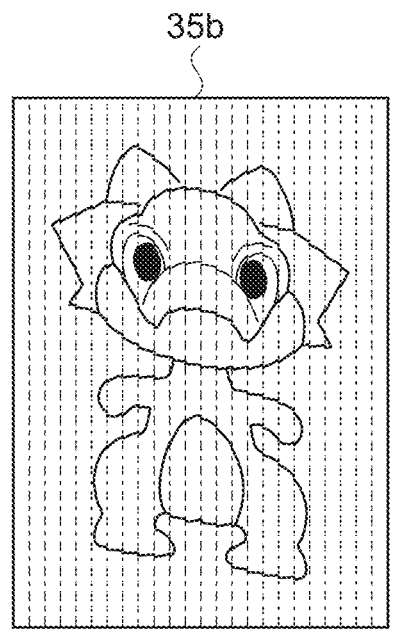
FIG. 14A A schematic diagram showing an example in a case where correction is continuously performed on the viewpoint image data in a predetermined direction.
Figure 14B:
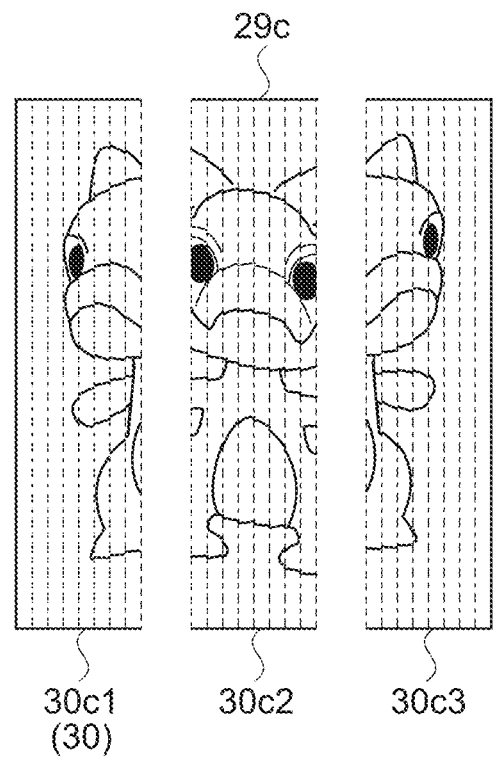
FIG. 14B A schematic diagram showing an example in a case where correction is continuously performed on the viewpoint image data in a predetermined direction.

FIGS. 14A and 14B are schematic diagrams showing an example in a case where correction is continuously performed on the viewpoint image data in a predetermined direction.

For example, the display state of the virtual image 1 can change non-uniformly depending on the change in the viewpoint position 2.

For example, in the example shown in FIG. 7, the change in the display position of the virtual image 1 uniformly occurs depending on the change in the viewpoint position 2. Unlike a change in the display position, the change in the display position can non-uniformly occur in the virtual image surface 3 depending on the change in the viewpoint position 2.

For example, it is assumed that when the virtual image 1 based on the viewpoint image data 35b is displayed in accordance with the movement from the viewpoint position 2a to the viewpoint position 2b, the change in the display state non-uniformly occurs in the virtual image surface 3.

As illustrated in FIG. 14A, in accordance with the non-uniform change in the display position, correction to change the display position continuously in the left and right direction of the image is performed on the viewpoint image data 35b. That is, the correction is performed in the left and right direction of the image smoothly (linearly) on the viewpoint image data 35b. Accordingly, the non-uniform change in the display position that depends on the change in the viewpoint position 2 can be reduced.

As schematically shown in FIG. 14B, the correction to change the display position continuously in the left and right direction of the image may be performed on each image regions 30 (30c1, 30c2, 30c3) of the corresponding image data 29c. That is, the correction may be performed on the single image region 30 smoothly (linearly) in the left and right direction of the image.

By performing the continuous correction for each of such image regions 30, the non-uniform change in the display position that depends on the change in the viewpoint position 2 can be reduced.

It should be noted that the correction to continuously change the display position may be performed on the entire corresponding image data 29c. That is, the correction may be performed smoothly (linearly) on the entire corresponding image data 29c without distinguishing the image regions 30.

It should be noted that in the example shown in FIGS. 14A and 14B, the correction for reducing the non-uniform change in the display position of the virtual image 1 has been exemplified. The present technology is not limited thereto, and the smooth correction as shown in FIGS. 14A and 14B may be performed for reducing a non-uniform change in the other display state, such as a non-uniform change in the luminance of the virtual image 1 and a non-uniform change in the chromaticity of the virtual image 1.

In this manner, the image processing A performed on the image data includes processing of continuously correcting the image data in the predetermined direction. The predetermined direction is, for example, the left and right direction or the upper and lower direction of the image. As a matter of course, the correction may be performed continuously in another direction.

Hereinafter, in the image display apparatus 100 and the multi-viewpoint display apparatus 110 according to this embodiment, the emission of the image light 8 is controlled by using the image data 15 generated in accordance with the change in the display state of the virtual image 1 that depends on the change in the viewpoint position 2. Accordingly, the change in the display state of the virtual image 1 that depends on the change in the viewpoint position 2 can be reduced.

An apparatus using the half mirror for the combiner is conceivable as the virtual image display apparatus that displays the virtual image. In a case where the half mirror is used, the position relationship between the emission unit and the combiner limits the viewpoint position capable of observing the virtual image 1 because the image light is regularly reflected. As a result, the degree of freedom in the apparatus design lowers, and the apparatus configuration is significantly limited.

In the image display apparatus 100 (the multi-viewpoint display apparatus 110) according to this embodiment, the diffractive optical element 6 such as the HOE is used for the combiner. Accordingly, the relationship between the angle of incidence and emission angle (diffraction angle) of the image light with respect to the combiner has a degree of freedom, and therefore the viewpoint position 2 capable of observing the virtual image 1 can be set with a high degree of freedom. As a result, limitations on the apparatus configuration such as the positions, the installation angles, and the like of the emission unit 5 (the multi-viewpoint video source 17), the diffractive optical element 6, and the like can be reduced.

It should be noted that the HOE combiner is used also in the holographic display system described in Patent Literature 1 above. However, in the holographic display system described in Patent Literature 1, the distortion (dynamic distortion) of the virtual image when moving the eyes from the observation position is reduced by designing the apparatus so that the virtual image observed at the normal position is largely distorted. Thus, the degree of freedom in the apparatus design lowers and the apparatus configuration is limited. Moreover, the changes in the luminance, the chromaticity, and the like of the virtual image when moving the eyes cannot be corrected.

In the image display apparatus 100 (multi-viewpoint display apparatus 110) according to this embodiment, the emission of the image light 8 (the viewpoint image light ray 19, the corresponding image light ray 27) is controlled using the image data 15 (the viewpoint image data 35, the corresponding image data 29) subjected to the image processing A. Accordingly, the change in the display state including the change in the display position of the virtual image 1, the change in the luminance of the virtual image 1, the change in the chromaticity of the virtual image 1, and the like that depend on the change in the viewpoint position 2 can be sufficiently reduced.

For example, also in a case where degradation and the like of the virtual image 1 that are caused by the HOE combiner, degradation and the like of the virtual image 1 that are caused by other factors occur, a desired light beam can be reproduced, and the multi-viewpoint display at significantly high accuracy can be realized by using the image data 15 according to the degradation.

It is difficult for the HOE combiner to keep the efficiency constant with respect to each incidence/emission angle, and the brightness and color tones of the virtual image can change when the observation position changes. The change in the brightness and color tones can be sufficiently reduced by using the present technology.

Moreover, in the image display apparatus 100 (multi-viewpoint display apparatus 110) according to this embodiment, the multi-viewpoint display at high accuracy can be realized without limiting the apparatus configuration such as the positions and the installation angles of the emission unit 5 (the multi-viewpoint video source 17), the diffractive optical element 6, and the like.

OTHER EMBODIMENTS

The present technology is not limited to the above-mentioned embodiments, and various other embodiments can be realized.

As the multi-viewpoint video source 17 shown in FIGS. 2A and 2B and the like, the multi-view display may be used. That is, as the emission unit 5 shown in FIGS. 1A and 1B, the multi-view display may be used.

The multi-view display is a direct-view-type display capable of displaying a multi-viewpoint image without using dedicated eye-glasses and the like.

The multi-viewpoint display has the image display screen that displays the multi-viewpoint image. In general, the direct-view-type multi-viewpoint display displays the multi-viewpoint image by displaying the plurality of viewpoint images in a plurality of display directions.

The multi-view display can be constituted by, for example, any one system of a lenticular lens system, a lens array system, or a parallax barrier system. As a matter of course, the present technology is not limited to those systems.

The lenticular lens system is a system that displays a viewpoint image in directions different from each other by using a lenticular lens that controls a light beam in the horizontal direction. By using the lenticular lens system, a bright viewpoint image can be displayed as compared to the parallax barrier system and the like.

The lens array system is a system that displays a viewpoint image by controlling a light beam in perpendicular and horizontal directions by the use of a micro-lens array. By using the lens array system, the multi-viewpoint configuration in the vertical direction can be achieved, and expression with a high sense of presence can be achieved.

The line-of-sight barrier system is a system that displays a viewpoint image by using a parallax barrier or the like that selectively blocks light of each pixel, and is capable of realizing a wider field-of-view angle than other systems.

In those systems, a flat-panel display such as a liquid crystal display (LCD) displays the original image of the viewpoint image. It is desirable that the light source used for the back light of the display is the laser light source. It should be noted that in a case where the back light utilizing the LED light sources is used, blurring and the like of the image due to the chromatic dispersion by the combiner (HOE) can be reduced by narrowing the wavelength width by using the wavelength filter and the like.

The multi-view display emits the viewpoint image light of each of the plurality of viewpoint images that is the plurality of target images corresponding to the plurality of viewpoint positions.

The emission control unit is capable of controlling the emission of a plurality of viewpoint image light rays due to the multi-view display by controlling the emission of the image light (hereinafter, referred to as multi-viewpoint image light) by the flat-panel display.

Moreover, the emission control unit controls the emission of the multi-viewpoint image light by the flat-panel display by using multi-viewpoint image data generated in accordance with the change in the display state of the virtual image that depends on the change in the viewpoint position.

Figure 15A:
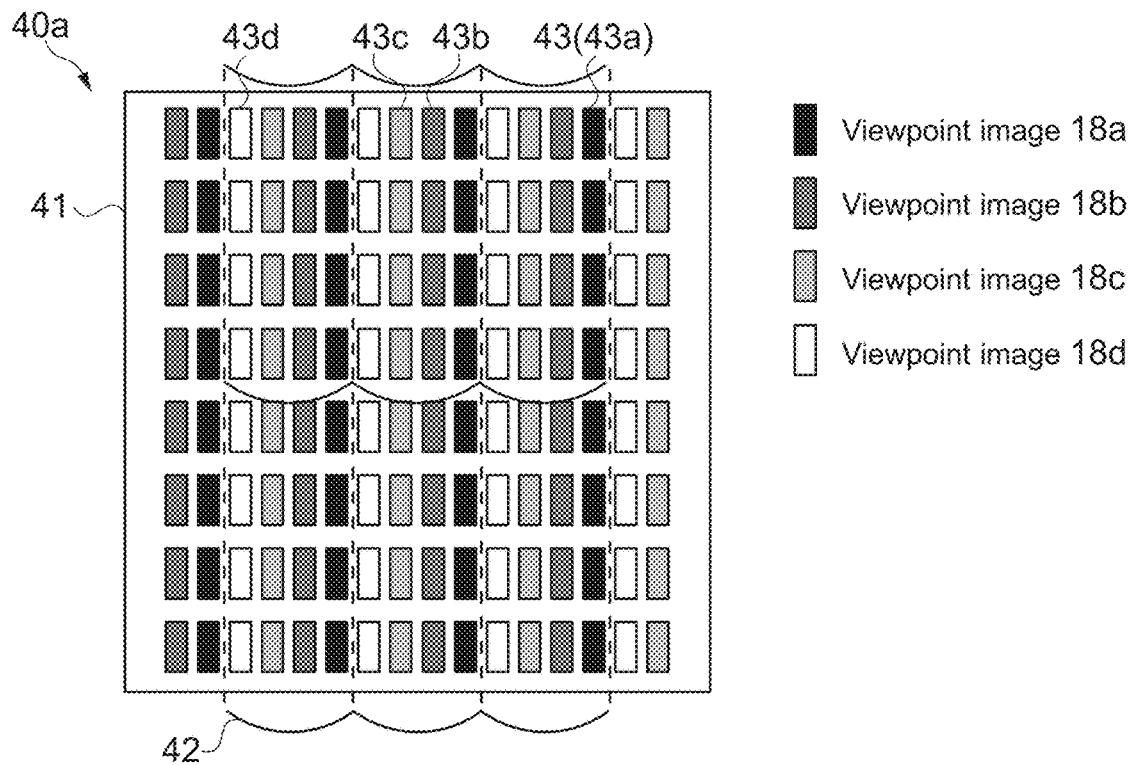
FIG. 15A A schematic diagram showing an example of multi-viewpoint image data.
Figure 15B:
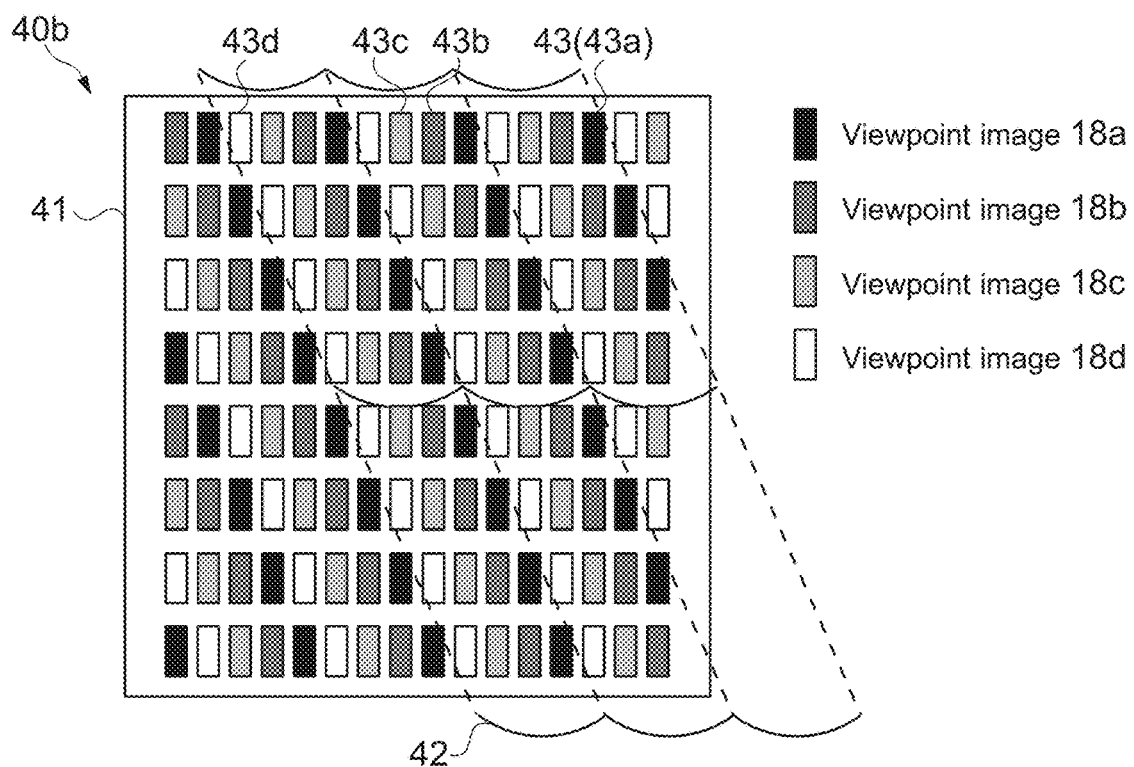
FIG. 15B A schematic diagram showing an example of multi-viewpoint image data.

FIGS. 15A and 15B are schematic diagrams showing a configuration example of the multi-view display of the lenticular lens system.

A multi-view display 40a shown in FIG. 15A includes a flat-display panel 41 and lenticular lenses 42.

The flat-display panel 41 has a plurality of pixels 43 arranged in the horizontal and vertical directions. The lenticular lenses 42 are arranged in the vertical direction.

The multi-view display 40a illustrated in FIG. 15A is capable of reproducing four viewpoint images 18a to 18d corresponding to four viewpoint positions 2a to 2d.

The viewpoint image light ray 19a is emitted by a pixel 43a displayed in black, and the viewpoint image 18a is reproduced via the lenticular lens 42.

The viewpoint image light ray 19b is emitted by a pixel 43b displayed in dark gray, and the viewpoint image 18b is reproduced via the lenticular lens 42.

The viewpoint image light ray 19c is emitted by a pixel 43c displayed in light gray, and the viewpoint image 18c is reproduced via the lenticular lens 42.

The viewpoint image light ray 19d is emitted by pixel 43d displayed in white, and the viewpoint image 18d is reproduced via the lenticular lens 42.

Therefore, the multi-viewpoint image data displayed by the flat-display panel 41 for reproducing the plurality of viewpoint images 18a to 18d is divided into a plurality of image regions, an image region formed of pixels 43a, an image region formed of pixels 43b, an image region formed of pixels 44c, and an image region formed of pixels 43d.

Multi-viewpoint image data 40 is subjected to the image processing for correcting the change in the display state of the virtual image 1 for each of the plurality of image regions. Typically, image processing for overcoming the change in the display state of the virtual image 1 is performed. That is, the various types of image processing A described above are performed.

Accordingly, the change in the display position of the virtual image 1 that depends on the change in the viewpoint position 2 can be reduced, and high-quality viewing experience can be provided. That is, a desired light beam can be reproduced with respect to the display target, and high-quality multi-viewpoint display can be realized.

As in a multi-view display 40b shown in FIG. 15B, the lenticular lenses 42 can also be obliquely arranged with respect to the flat-display panel 41.

In this case, as shown in FIG. 15B, not the plurality of pixels 43 arranged in the vertical direction but also the plurality of pixels 43 arranged obliquely are allocated as the pixels 43 for reproducing the same viewpoint image 18. As a result, the resolution balance in the horizontal and vertical directions can be improved.

As in a multi-view display 40b shown in FIG. 15B, the multi-viewpoint image data is divided into a plurality of image regions, an image region formed of pixels 43a, an image region formed of pixels 43b, an image region formed of pixels 44c, and an image region formed of pixels 43d.

By performing the image processing for correcting the change in the display state of the virtual image 1 for each of the plurality of image regions, the change in the display position of the virtual image 1 that depends on the change in the viewpoint position 2 can be reduced, and high-quality viewing experience can be provided.

Also for multi-view displays other than the lenticular lens system, the present technology can be applied. By performing the image processing for correcting the change in the display state of the virtual image 1 on the multi-viewpoint image data displayed by the flat-display panel 41, the change in the display position of the virtual image 1 that depends on the change in the viewpoint position 2 can be reduced, and high-quality viewing experience can be provided. That is, a desired light beam can be reproduced with respect to the display target, and high-quality multi-viewpoint display can be realized.

As described above, in the lens array system using the micro-lens array, the multi-viewpoint configuration not only in the horizontal direction but also in the vertical direction can be achieved. By applying the present technology, the change in the display position of the virtual image 1 that depends on the change in the viewpoint position 2 can be reduced not only in the horizontal direction but also in the vertical direction, and high-quality viewing experience can be provided.

Figure 16:
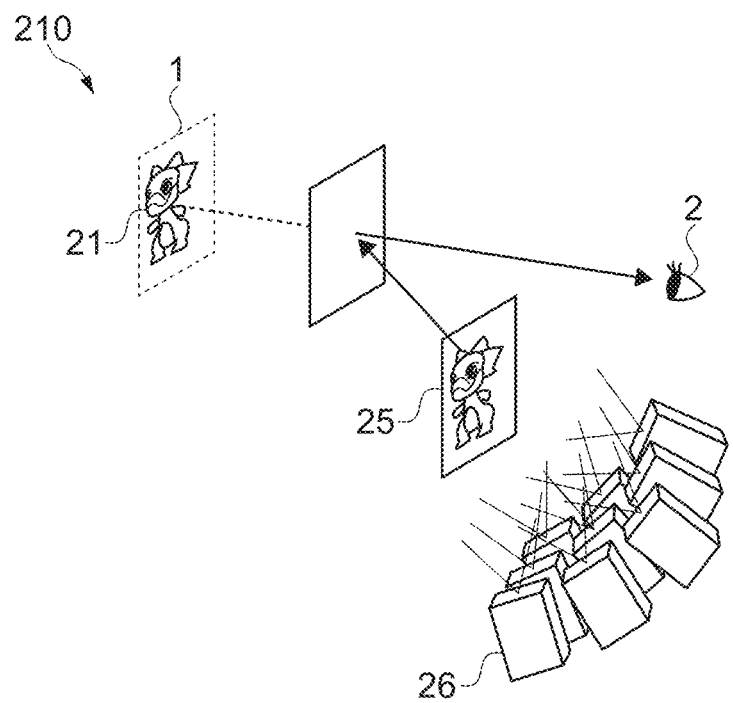
FIG. 16 A schematic diagram showing a configuration example of a multi-viewpoint display apparatus according to another embodiment.

In the multi-viewpoint display apparatus 210 shown in FIG. 16, the plurality of projectors 26 is arranged in two axes in the left and right direction (horizontal direction) and the upper and lower direction (vertical direction) with respect to the diffusion screen. It should be noted that the projectors 26 are arranged also in the vertical direction, and therefore the diffusion screen not having the anisotropic diffusion characteristics can be used.

Accordingly, the plurality of viewpoint images corresponding to the plurality of viewpoint positions 2 can be displayed not only in the left and right direction but also in the upper and lower direction. As a result, the display of the virtual image 1 can be switched in accordance with the movement of the viewpoint position 2 in the upper and lower direction. Therefore, the user can observe the different orientations of the virtual image 1 not only in the left and right direction but also in the upper and lower direction.

For example, the user can observe the head top of the character 21 by moving the viewpoint position 2 upward. Moreover, the user can observe the lower jaw of the character 21 by moving the viewpoint position 2 downward. As a matter of course, the present technology is not limited to such display of the virtual image 1.

Figure 17:
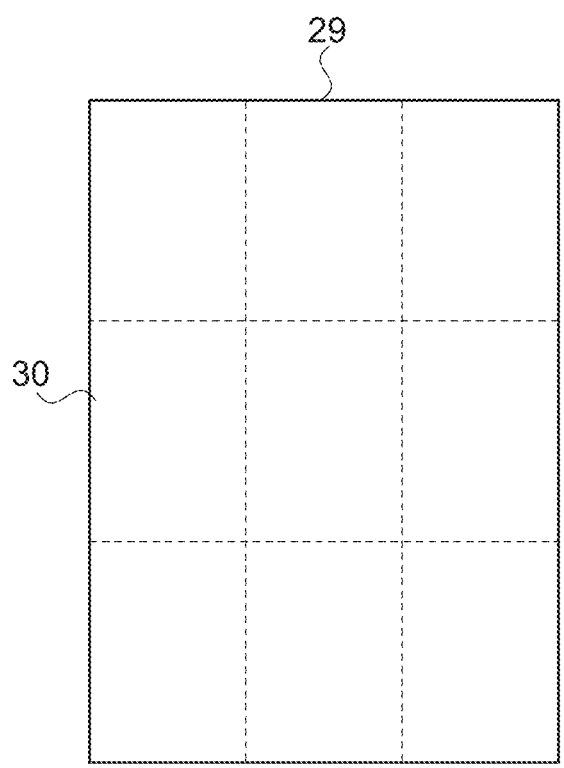
FIG. 17 A schematic diagram showing examples of a plurality of pieces of corresponding image data corresponding to a plurality of projectors shown in FIG. 16.

FIG. 17 is a schematic diagram showing an example of the plurality of pieces of corresponding image data 29 corresponding to the plurality of projectors 26 shown in FIG. 16.

For example, as shown in FIG. 17, nine image regions 30 divided in each of the left and right direction and the upper and lower direction of the image. At least one of the plurality of image regions 30 corresponds to a part of any one viewpoint image of the plurality of viewpoint images.

The corresponding image data 29 is subjected to the image processing for correcting the change in the display state of the virtual image 1 for each of the plurality of image regions 30. That is, the various types of image processing A described above are performed.

Accordingly, the change in the display position of the virtual image 1 that depends on the change in the viewpoint position 2 can be reduced not only in the left and right direction (horizontal direction) but also in the upper and lower direction (vertical direction), and high-quality viewing experience can be provided. That is, a desired light beam can be reproduced with respect to the display target, and high-quality multi-viewpoint display can be realized.

The setting of the plurality of image regions 30 is not limited to the division as shown in FIG. 17. For example, the plurality of image regions 30 only needs to be set as appropriate in accordance with the arrangement configuration of the projectors 26 or the like.

Figure 18A:
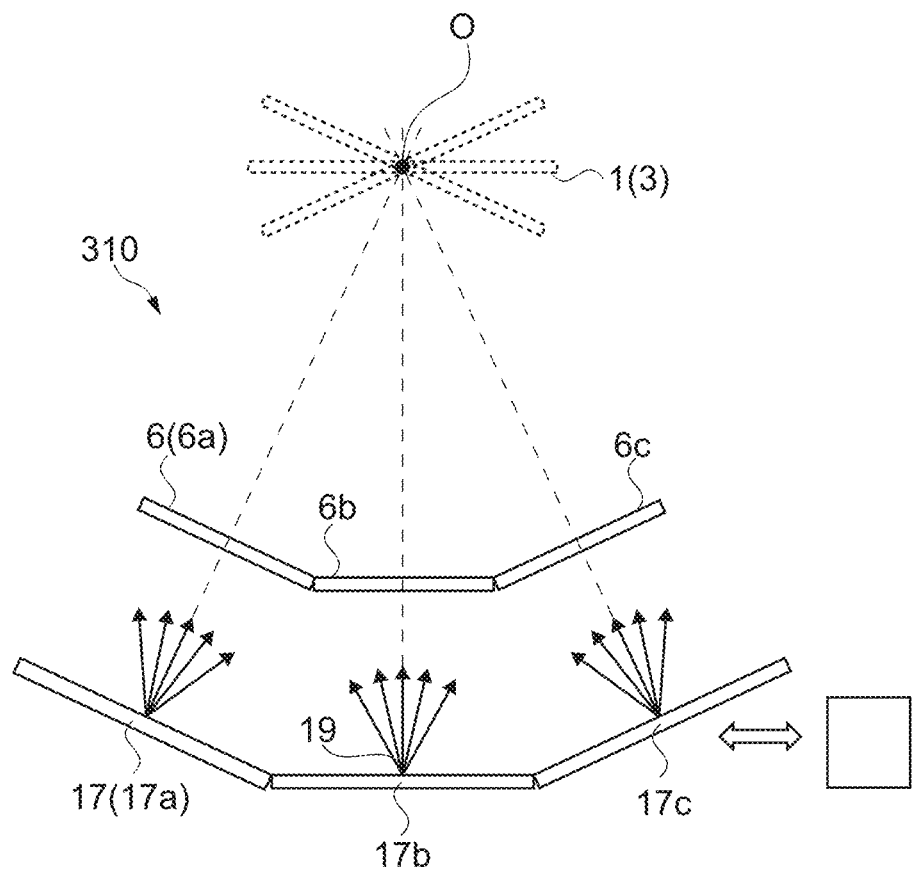
FIG. 18A A schematic diagram showing configurations example of multi-viewpoint display apparatuses according to other embodiments.

In a multi-viewpoint display apparatus 310 shown in FIG. 18A, a plurality of diffractive optical elements 6 (6a to 6c) and a plurality of multi-viewpoint video sources 17 (17a to 17c) corresponding thereto are used.

The diffractive optical elements 6a to 6c are arranged surrounding an center axis O. That is, the diffractive optical elements 6a to 6c are arranged on a circle having the center axis O as the center.

The multi-viewpoint video sources 17a to 17c are respectively arranged in the corresponding diffractive optical elements 6a to 6c so as to be capable of emitting the plurality of viewpoint image light rays 19. The multi-viewpoint video sources 17a to 17c are arranged so that the emission surfaces for the viewpoint image light rays 19 face the center axis O.

It can also be said that the configuration shown in FIG. 18A is a configuration in which a plurality of pairs of the diffractive optical element 6 and the multi-viewpoint video source 17 is arranged.

By employing such a configuration, the different orientations of the virtual image 1 can be observed in a much wider range in the left and right direction (horizontal direction). Moreover, as shown in FIG. 18A, the virtual image surface 3 on which the virtual image 1 is formed is formed using the center axis O as the basis. Thus, the display of the virtual image 1 as if the display target exists at the center axis O can be realized.

Figure 18B:
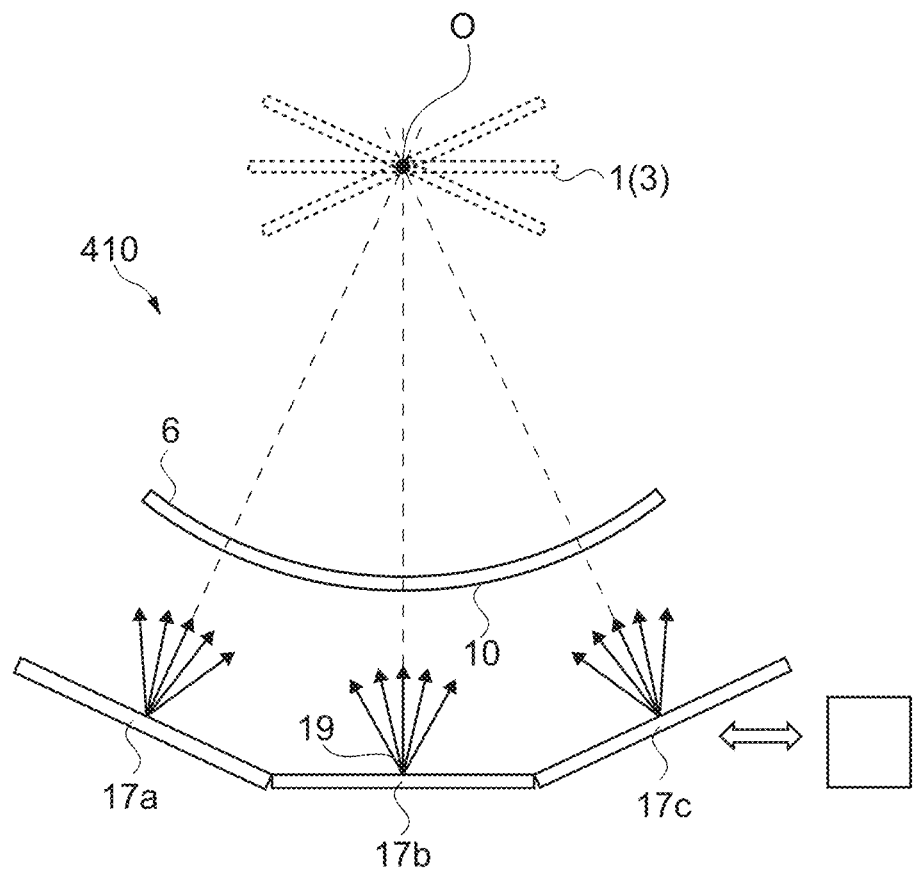
FIG. 18B A schematic diagram showing configurations example of multi-viewpoint display apparatuses according to other embodiments.

In a multi-viewpoint display apparatus 410 shown in FIG. 18B, a diffractive optical element 6 formed of a curved surface shape and a plurality of multi-viewpoint video sources 17 (17a to 17c) are used.

The diffractive optical element 6 is arranged surrounding the center axis O. That is, the diffractive optical element 6 is arranged on a circle having the center axis O as the center.

Viewpoint image light rays 19 respectively emitted from a plurality of multi-viewpoint video sources 17a to 17c are emitted to an incident surface 10 formed of the curved surface shape of the diffractive optical element 6.

By the diffractive optical element 6 diffracting and emitting the viewpoint image light rays 19, the virtual image 1 is displayed using the center axis O as the basis.

Also in such a configuration, the different orientations of the virtual image 1 can be observed in a much wider range in the left and right direction (horizontal direction). Moreover, the display of the virtual image 1 as if the display target exists at the center axis O can be realized.

Figure 19:
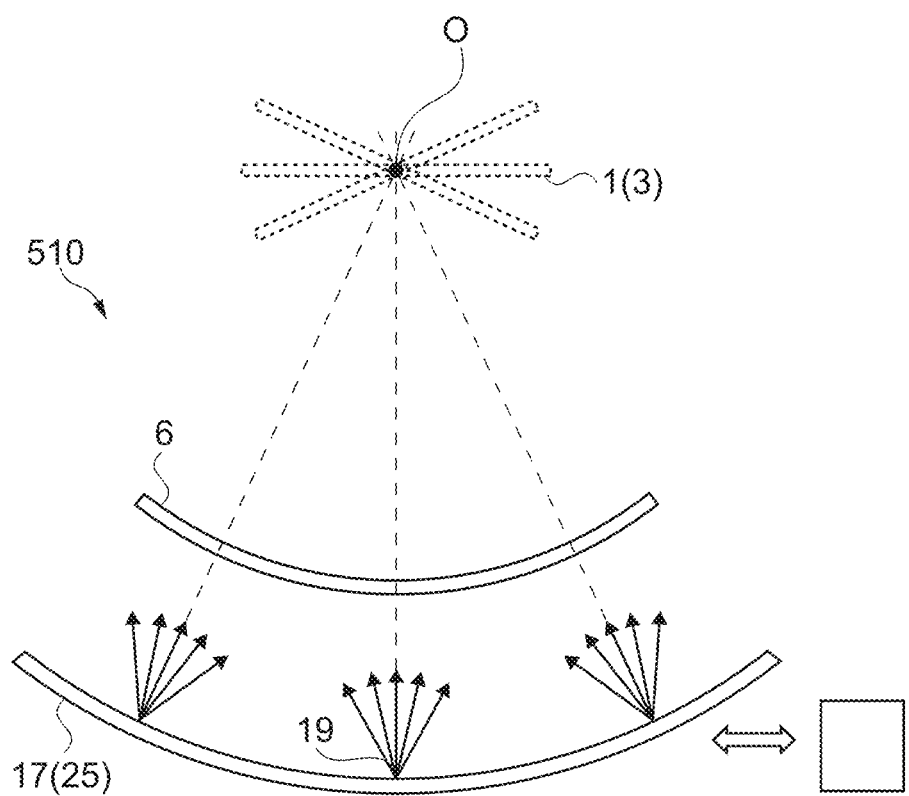
FIG. 19 A schematic diagram showing a configuration example of a multi-viewpoint display apparatus according to another embodiment.

In the multi-viewpoint display apparatus 510 shown in FIG. 19, the diffractive optical element 6 formed of a curved surface shape and the multi-viewpoint video source 17 formed of a curved surface shape are used.

The diffractive optical element 6 is arranged surrounding the center axis O. That is, the diffractive optical element 6 is arranged on a circle having the center axis O as the center.

As the multi-viewpoint video source 17, for example, the display of the multi-projector system as shown in FIGS. 4 and 16 is used. The transmissive anisotropic diffusion screen 25 of the display of the multi-projector system is constituted by the curved surface shape and is arranged surrounding the center axis O.

The plurality of projectors 26 emits the corresponding image light rays 27 to the plurality of regions of the anisotropic diffusion screen 25 formed of the curved surface shape (see FIG. 4). Accordingly, the viewpoint image light rays 19 are emitted toward the diffractive optical element 6 from the plurality of regions of the anisotropic diffusion screen 25.

Also in such a configuration, the different orientations of the virtual image 1 can be observed in a much wider range in the left and right direction (horizontal direction). Moreover, the display of the virtual image 1 as if the display target exists at the center axis O can be realized.

The present technology can also be applied to the multi-viewpoint display apparatuses 310 to 510 shown in FIGS. 18 and 19. Accordingly, the change in the display position of the virtual image 1 that depends on the change in the viewpoint position 2 can be reduced, and high-quality viewing experience can be provided.

Otherwise, an arbitrary configuration may be employed as the image display apparatus (multi-viewpoint display apparatus) according to the present technology.

For example, the plurality of diffractive optical elements 6 may be arranged to cover the entire periphery of the center axis O. That is, the plurality of diffractive optical elements 6 may be arranged so as to constitute a cylindrical shape. The viewpoint image light rays 19 are emitted to the plurality of diffractive optical elements 6 at 360 degrees in all directions. Accordingly, the different orientations of the virtual image 1 can be observed at 360 degrees in all directions.

In a case where the plurality of diffractive optical elements 6 is used, the incident surfaces that the image light rays enter may be spaced apart from each other. Moreover, it is also possible to emit the viewpoint image light rays 19 to the plurality of regions of the diffractive optical element 6 by using a single video source.

Figure 20:
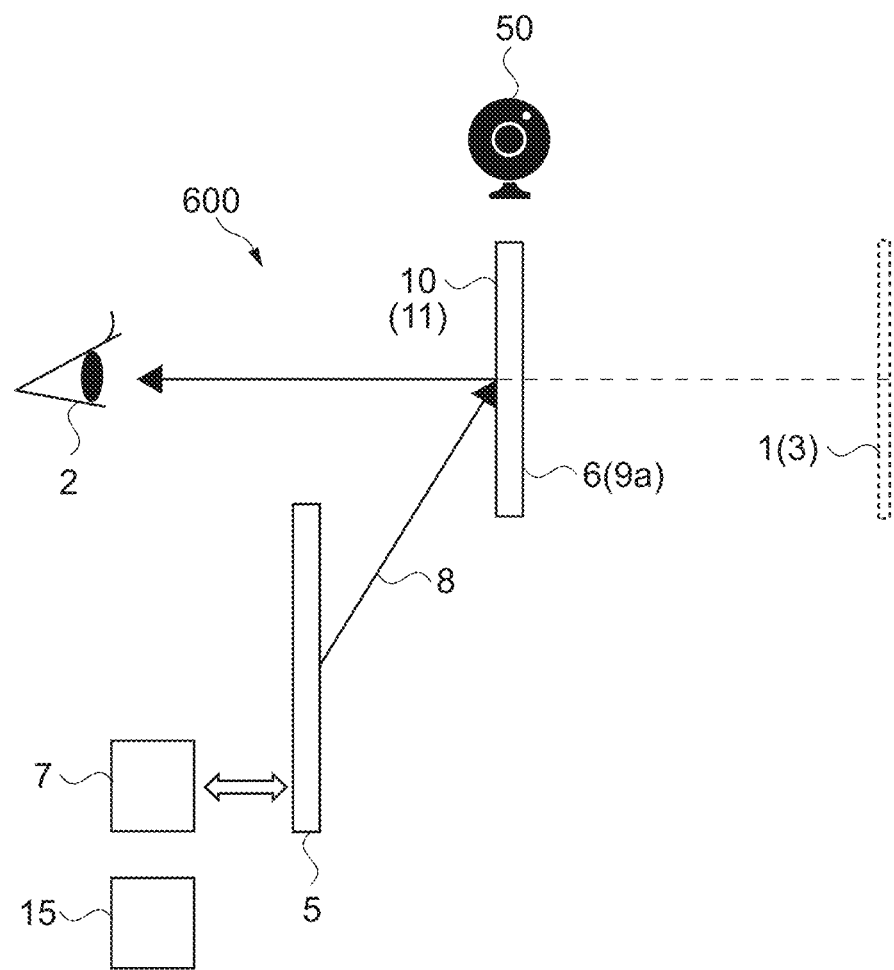
FIG. 20 A schematic diagram showing a configuration example of an image display apparatus according to another embodiment.

An image display apparatus 600 shown in FIG. 20 further includes a camera 50.

The camera 50 is installed to be capable of imaging a face region including the user's eyes. For example, the camera 50 is set to be capable of imaging the user's face region also when the user moves the viewpoint position 2 within the range capable of observing the virtual image 1.

For example, a digital camera including an image sensor such as a complementary metal-oxide semiconductor (CMOS) sensor and a charge coupled device (CCD) sensor is used as the camera 50. Moreover, for example, an infrared camera on which an infrared light such as an infrared ray LED is mounted may be used.

In the image display apparatus 600, a viewpoint position detection unit (not shown) is configured as a software block, and the viewpoint position 2 is detected on the basis of an image captured by the camera 50.

A method of detecting the viewpoint position 2 on the basis of a captured image is not limited, and an arbitrary technology such as face tracking may be used. For example, a machine learning algorithm using a neural network such as a recurrent neural network (RNN), a convolutional neural network (CNN), and a multilayer perceptron (MLP) may be used. Otherwise, an arbitrary machine learning algorithm that performs a supervised learning method, unsupervised learning method, a semi-supervised learning method, a reinforcement learning method, or the like may be used.

The software block configured as the viewpoint position detection unit is configured by, for example, the processor of the emission control unit 7 executing a program according to the present technology. Alternatively, the viewpoint position detection unit may be configured in the camera 50. Alternatively, the viewpoint position detection unit may be configured by another computer on a network.

In the example shown in FIG. 20, the camera 50 and the viewpoint position detection unit realize the detection unit that detects the viewpoint position. As a matter of course, a method of realizing the detection unit is not limited.

In the image display apparatus 600 shown in FIG. 20, the flat-panel display is used as the emission unit 5.

Moreover, the image data generated in accordance with the viewpoint position 2 is used as the image data 15 generated in accordance with the display state of the virtual image 1. Therefore, image light that configures an image corresponding to a viewpoint position 2 is emitted from a flat display as the emitted light 8.

The emission control unit 7 selects the image data corresponding to the viewpoint position 2 on the basis of the viewpoint position 2 detected by the viewpoint position detection unit. Then, on the basis of the selected image data, the image corresponding to the viewpoint position 2 is displayed on the flat display. That is, the emission control unit 7 controls the emission of the image light by the flat display on the basis of the detected viewpoint position 2.

Accordingly, when moving the viewpoint position 2, the user can observe the virtual image 1 of the image corresponding to each viewpoint position 2. That is, the user can observe the different orientations of the virtual image 1. In this manner, in the image display apparatus 600, the multi-viewpoint display for the virtual image 1 can be realized without using the multi-viewpoint video source.

The image data of each of the plurality of images corresponding to the plurality of viewpoint positions 2 is corrected as appropriate on the basis of the optical properties of the diffractive optical element. Accordingly, the change in the display position of the virtual image 1 that depends on the change in the viewpoint position 2 can be reduced, and high-quality viewing experience can be provided.

The present technology can also be applied in a case where the diffractive optical element regularly reflects the image light.

In the present disclosure, it is assumed that the concepts that define the shape, the size, the position relationship, the state, and the like such as "center", "middle", "uniform", "equal", "the same", "orthogonal", "parallel", "symmetric", "extending", "axial", "columnar", "cylindrical", "ring-shaped", and "annular" are concepts including "substantially center", "substantially middle", "substantially uniform", "substantially equal", "substantially the same", "substantially orthogonal", "substantially parallel", "substantially symmetric", "substantially extending", "substantially axial", "substantially columnar", "substantially cylindrical", "substantially ring-shaped", "substantially annular", and the like.

For example, states included in a predetermined range (e.g., ±10% range) using "completely center", "completely middle", "completely uniform", "completely equal", "completely the same", "completely orthogonal", "completely parallel", "completely symmetric", "completely extending", "completely axial", "completely columnar", "completely cylindrical", "completely ring-shaped", "completely annular", and the like as the basis are also included.

At least two features of the features according to the present technology, which have been described above, may be combined. That is, the various features described in the respective embodiments may be arbitrarily combined across the respective embodiments. Moreover, the above-mentioned various effects are merely exemplary and not limitative, and other effects may be provided.

It should be noted that the present technology can also take the following configurations.

(1) An image display apparatus, including:
  an emission unit that emits image light of a target image;
  a diffractive optical element that includes an incident surface and an emission surface, diffracts the image light entering the incident surface, emits the image light from the emission surface, and displays a virtual image that is the target image; and
  an emission control unit that controls emission of the image light by the emission unit by using image data generated in accordance with a change in a display state of the virtual image that depends on a change in a viewpoint position.

(2) The image display apparatus according to (1), in which
  the change in the display state of the virtual image includes at least one of a change in a display position of the virtual image, a change in a luminance of the virtual image, or a change in chromaticity of the virtual image.

(3) The image display apparatus according to (1) or (2), in which
  the emission unit emits viewpoint image light of each of the plurality of viewpoint images that is a plurality of target images corresponding to a plurality of viewpoint positions, and
  the emission control unit controls emission of the viewpoint image light by the emission unit by using a plurality of pieces of viewpoint image data that corresponds to the plurality of viewpoint images and is generated in accordance with the change in the display state of the virtual image that depends on the change in the viewpoint position.

(4) The image display apparatus according to (3), in which
  the plurality of pieces of viewpoint image data is subjected to image processing for correcting the change in the display state of the virtual image.

(5) The image display apparatus according to (4), in which
  the image processing for correcting the change in the display state of the virtual image is performed on the basis of optical properties of the diffractive optical element.

(6) The image display apparatus according to (4) or (5), in which
  the image processing for correcting the change in the display state of the virtual image includes processing of continuously performing correction on each of the plurality of pieces of viewpoint image data in a predetermined direction.

(7) The image display apparatus according to any one of (1) to (6), in which
  the emission unit includes a plurality of projectors,
  using image light emitted from each of the plurality of projectors as corresponding image light,
  the emission control unit uses a plurality of pieces of corresponding image data corresponding to the plurality of projectors to control emission of corresponding image light by each of the plurality of projectors to thereby control the emission of the image light by the emission unit, and
  the plurality of pieces of corresponding image data is generated in accordance with the change in the display state of the virtual image that depends on the change in the viewpoint position.

(8) The image display apparatus according to (7), in which
  the emission unit emits viewpoint image light of each of a plurality of viewpoint images that is a plurality of target images corresponding to a plurality of viewpoint positions, and
  each of the plurality of pieces of corresponding image data is divided into a plurality of image regions at least one of which corresponds to a part of the viewpoint image.

(9) The image display apparatus according to (8), in which
  the image regions different from each other in at least one of the plurality of pieces of corresponding image data correspond to respective parts of the viewpoint images different from each other.

(10) The image display apparatus according to (8) or (9), in which
  each of the plurality of pieces of corresponding image data is subjected to image processing for correcting the change in the display state of the virtual image for each of the plurality of image regions.

(11) The image display apparatus according to (10), in which
  the image processing for correcting the change in the display state of the virtual image includes processing of continuously performing correction on each of the plurality of image regions in a predetermined direction.

(12) The image display apparatus according to any one of (1) to (6), in which
  the emission unit includes a multi-view display constituted by any one system of a lenticular lens system, a lens array system, or a parallax barrier system, and
  the emission control unit controls emission of the image light by the multi-view display by using multi-viewpoint image data generated in accordance with the change in the display state of the virtual image that depends on the change in the viewpoint position.

(13) The image display apparatus according to (12), in which
  the multi-view display emits viewpoint image light of each of a plurality of viewpoint images that is a plurality of target images corresponding to a plurality of viewpoint positions, and
  the multi-viewpoint image data is divided into a plurality of image regions corresponding to the plurality of viewpoint images.

(14) The image display apparatus according to (13), in which
  the multi-viewpoint image data is subjected to image processing for correcting the change in the display state of the virtual image for each of the plurality of image regions.

(15) The image display apparatus according to (14), in which
  the image processing for correcting the change in the display state of the virtual image includes processing of continuously performing correction on each of the plurality of image regions in a predetermined direction.

(16) The image display apparatus according to any one of (1) to (15), in which
  the diffractive optical element is a reflective holographic optical element or a transmissive holographic optical element.

(17) The image display apparatus according to (1), further including
a detection unit that detects the viewpoint position, in which
the image data generated in accordance with the change in the display state is image data generated in accordance with the viewpoint position, and
the emission control unit controls the emission of the image light by the emission unit on the basis of the detected viewpoint position.

REFERENCE SIGNS LIST 1 virtual image
2 viewpoint position
5 emission unit
6 diffractive optical element
7 emission control unit
8 image light
9a reflective HOE
9b transmissive HOE
10 incident surface
11 emission surface
15 image data
17 multi-viewpoint video source
18 viewpoint image
19 viewpoint image light
21 character
25 anisotropic diffusion screen
26 projector
27 corresponding image light
29 corresponding image data
30 image region of corresponding image data
35 viewpoint image data
40 multi-viewpoint image data
41 image region of multi-viewpoint image data
50 camera
100, 600 image display apparatus
110, 210, 310, 410, 510 multi-viewpoint display apparatus

What is claimed is:

1. An image display apparatus, comprising:
an emission unit that emits image light of a target image;
a diffractive optical element that includes an incident surface and an emission surface, diffracts the image light entering the incident surface, emits the image light from the emission surface, and displays a virtual image that is the target image; and
an emission control unit that controls emission of the image light by the emission unit by using image data generated in accordance with a change in a display state of the virtual image that depends on a change in a viewpoint position,
wherein the change in the display state of the virtual image includes at least one of a change in a change in a luminance of the virtual image or a change in chromaticity of the virtual image.

2. The image display apparatus according to claim 1, wherein
the emission unit emits viewpoint image light of each of the plurality of viewpoint images that is a plurality of target images corresponding to a plurality of viewpoint positions, and
the emission control unit controls emission of the viewpoint image light by the emission unit by using a plurality of pieces of viewpoint image data that corresponds to the plurality of viewpoint images and is generated in accordance with the change in the display state of the virtual image that depends on the change in the viewpoint position.

3. The image display apparatus according to claim 2, wherein the plurality of pieces of viewpoint image data is subjected to image processing for correcting the change in the display state of the virtual image.

4. The image display apparatus according to claim 3, wherein the image processing for correcting the change in the display state of the virtual image is performed on a basis of optical properties of the diffractive optical element.

5. The image display apparatus according to claim 3, wherein the image processing for correcting the change in the display state of the virtual image includes processing of continuously performing correction on each of the plurality of pieces of viewpoint image data in a predetermined direction.

6. The image display apparatus according to claim 1, wherein
the emission unit includes a plurality of projectors,
using image light emitted from each of the plurality of projectors as corresponding image light,
the emission control unit uses a plurality of pieces of corresponding image data corresponding to the plurality of projectors to control emission of corresponding image light by each of the plurality of projectors to thereby control the emission of the image light by the emission unit, and
the plurality of pieces of corresponding image data is generated in accordance with the change in the display state of the virtual image that depends on the change in the viewpoint position.

7. The image display apparatus according to claim 6, wherein
the emission unit emits viewpoint image light of each of a plurality of viewpoint images that is a plurality of target images corresponding to a plurality of viewpoint positions, and
each of the plurality of pieces of corresponding image data is divided into a plurality of image regions at least one of which corresponds to a part of the viewpoint image.

8. The image display apparatus according to claim 7, wherein the image regions different from each other in at least one of the plurality of pieces of corresponding image data correspond to respective parts of the viewpoint images different from each other.

9. The image display apparatus according to claim 7, wherein each of the plurality of pieces of corresponding image data is subjected to image processing for correcting the change in the display state of the virtual image for each of the plurality of image regions.

10. The image display apparatus according to claim 9, wherein the image processing for correcting the change in the display state of the virtual image includes processing of continuously performing correction on each of the plurality of image regions in a predetermined direction.

11. The image display apparatus according to claim 1, wherein
the emission unit includes a multi-view display constituted by any one system of a lenticular lens system, a lens array system, or a parallax barrier system, and
the emission control unit controls emission of the image light by the multi-view display by using multi-viewpoint image data generated in accordance with the change in the display state of the virtual image that depends on the change in the viewpoint position.

12. The image display apparatus according to claim 11, wherein
the multi-view display emits viewpoint image light of each of a plurality of viewpoint images that is a plurality of target images corresponding to a plurality of viewpoint positions, and
the multi-viewpoint image data is divided into a plurality of image regions corresponding to the plurality of viewpoint images.

13. The image display apparatus according to claim 12, wherein the multi-viewpoint image data is subjected to image processing for correcting the change in the display state of the virtual image for each of the plurality of image regions.

14. The image display apparatus according to claim 13, wherein the image processing for correcting the change in the display state of the virtual image includes processing of continuously performing correction on each of the plurality of image regions in a predetermined direction.

15. The image display apparatus according to claim 1, wherein the diffractive optical element is a reflective holographic optical element or a transmissive holographic optical element.

16. The image display apparatus according to claim 1, further comprising:
a detection unit that detects the viewpoint position,
wherein the image data generated in accordance with the change in the display state is image data generated in accordance with the viewpoint position, and
wherein the emission control unit controls the emission of the image light by the emission unit on a basis of the detected viewpoint position.

17. An image display apparatus, comprising:
an emission unit that emits image light of a target image;
a diffractive optical element that includes an incident surface and an emission surface, diffracts the image light entering the incident surface, emits the image light from the emission surface, and displays a virtual image that is the target image; and
an emission control unit that controls emission of the image light by the emission unit by using image data generated in accordance with a change in a display state of the virtual image that depends on a change in a viewpoint position,
wherein the emission unit includes a multi-view display constituted by a parallax barrier system, and
wherein the emission control unit controls emission of the image light by the multi-view display by using multi-viewpoint image data generated in accordance with the change in the display state of the virtual image that depends on the change in the viewpoint position.

18. The image display apparatus according to claim 17, wherein the multi-viewpoint image data is subjected to image processing for correcting the change in the display state of the virtual image for each of the plurality of image regions.

19. The image display apparatus according to claim 18, wherein the image processing for correcting the change in the display state of the virtual image includes processing of continuously performing correction on each of the plurality of image regions in a predetermined direction.

20. The image display apparatus according to claim 19, wherein the image processing for correcting the change in the display state of the virtual image includes processing of continuously performing correction on each of the plurality of image regions in a predetermined direction.

* * * * *